United States Patent
Szczepanik et al.

(10) Patent No.: US 11,003,493 B2
(45) Date of Patent: May 11, 2021

(54) APPLICATION AND STORAGE BASED SCHEDULING

(71) Applicant: International Business Machines Corporation, Armonk, NY (US)

(72) Inventors: Grzegorz Piotr Szczepanik, Cracow (PL); Lukasz Jakub Palus, Cracow (PL); Kushal Patel, Pune (IN); Sarvesh Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 257 days.

(21) Appl. No.: 16/044,688

(22) Filed: Jul. 25, 2018

(65) Prior Publication Data

US 2020/0034194 A1    Jan. 30, 2020

(51) Int. Cl.
*G06F 9/48* (2006.01)
*G06F 3/06* (2006.01)
*G06N 20/00* (2019.01)

(52) U.S. Cl.
CPC ............ *G06F 9/4881* (2013.01); *G06F 3/061* (2013.01); *G06F 3/067* (2013.01); *G06F 3/0653* (2013.01); *G06F 3/0659* (2013.01); *G06N 20/00* (2019.01)

(58) Field of Classification Search
CPC ........ G06F 9/4881; G06F 3/067; G06F 3/061; G06F 3/0653; G06F 3/0659; G06F 3/0679; G06N 20/00
USPC ........................................ 711/100, E12.001
See application file for complete search history.

(56) References Cited

U.S. PATENT DOCUMENTS

| 8,560,779 | B2 | 10/2013 | Castillo et al. |
| 9,251,086 | B2* | 2/2016 | Peterson ............ G06F 12/0893 |
| 9,304,902 | B2 | 4/2016 | Mehrotra et al. |
| 2008/0270363 | A1 | 10/2008 | Hunt et al. |
| 2008/0294996 | A1 | 11/2008 | Hunt et al. |
| 2013/0185487 | A1* | 7/2013 | Kim .................... G06F 12/0246 711/103 |
| 2014/0164603 | A1 | 6/2014 | Castel et al. |

(Continued)

FOREIGN PATENT DOCUMENTS

WO    WO2015113636 A1    8/2015

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Yaima Rigol
*Assistant Examiner* — Edward Waddy, Jr.
(74) *Attorney, Agent, or Firm* — Christopher Pignato; George S. Blasiak; Heslin Rothenberg Farley & Mesiti PC

(57) ABSTRACT

Methods, computer program products, and systems are presented. The method computer program products, and systems can include, for instance: (a) obtaining grooming operation scheduling data specifying a schedule of grooming operations performed by at least first and second layers of the plurality of layers; (b) identifying, using data of grooming operation scheduling data, at least one gap in the execution of scheduled operations performed by the storage system; (c) moving an execution time of one or more grooming operation of the grooming operations into said at least one gap; and (d) repeating steps (a) to (c) to adapt to a changing usage pattern of said storage system.

21 Claims, 11 Drawing Sheets

(56) References Cited

U.S. PATENT DOCUMENTS

2017/0140278 A1    5/2017  Gupta et al.
2019/0155749 A1*   5/2019  Hahn .................. G06F 12/0246
2019/0180831 A1*   6/2019  Shukla .................. G11C 16/26

OTHER PUBLICATIONS

S. Nagina, "*Scheduling Algorithms in Big Data: A Survey*" International Journal of Engineering and Computer Science, ISSN: 2319-7242, vol. 5, Issue 8, pp. 17737-17743, Aug. 2016.

S. Jun, et al. "*Scalable Multi-Access Flash Store for Big Data Analytics*" Proceedings of the 2014 ACM/SIGDA International Symposium of Field-Programmable Gate Arrays, ISBN: 978-1-4503-2671-7, pp. 55-64, Feb. 26-28, 2014.

IBM, "*IBM PureData System for Analytics*" IBM.com, https://www.ibm.com/in-en/marketplace/puredata-system-for-analytics, accessed Jul. 25, 2018.

* cited by examiner

APPLICATION AND STORAGE BASED SCHEDULING

BACKGROUND

Commercially available unified storage systems can provide a set of utilities in one physical platform. The physical platform can include e.g. one or more server to install and run an application desired, one or more SAN switch connected to the one or more server and one or more storage virtualization appliance along with backend disk subsystems attached to them. Commercially available unified storage system can include a complete I/O stack from application layer to I/O management layer followed by the actual disk drives where the data and metadata is stored.

Commercially available unified storage systems can provide storage access at a block level and/or at a file level and can provide consolidated block and file services to clients, physical servers, and virtual servers. Commercially available unified storage systems can provide block and file services across multiple protocols often through a common interface and can support different kinds of storage including storage area networks (SANs), fiber channel, and internet small computer system interface (ISCSI) storage. Commercially available unified storage systems can accommodate file based storage methods such as network attached storage scenarios (NAS). SANs can provide a secure highspeed data transfer that provides access to consolidated block level storage.

SUMMARY

Shortcomings of the prior art are overcome, and additional advantages are provided, through the provision, in one aspect, of a method. The method can include, for example: (a) obtaining grooming operation scheduling data specifying a schedule of grooming operations performed by at least first and second layers of the plurality of layers; (b) identifying, using data of grooming operation scheduling data, at least one gap in the execution of scheduled operations performed by the storage system; (c) moving an execution time of one or more grooming operation of the grooming operations into said at least one gap; and (d) repeating steps (a) to (c) to adapt to a changing usage pattern of said storage system.

In another aspect, a computer program product can be provided. The computer program product can include a computer readable storage medium readable by one or more processing circuit and storing instructions for execution by one or more processor for performing a method. The method can include, for example: (a) obtaining grooming operation scheduling data specifying a schedule of grooming operations performed by at least first and second layers of the plurality of layers; (b) identifying, using data of grooming operation scheduling data, at least one gap in the execution of scheduled operations performed by the storage system; (c) moving an execution time of one or more grooming operation of the grooming operations into said at least one gap; and (d) repeating steps (a) to (c) to adapt to a changing usage pattern of said storage system.

In a further aspect, a system can be provided. The system can include, for example a memory. In addition, the system can include one or more processor in communication with the memory. Further, the system can include program instructions executable by the one or more processor via the memory to perform a method. The method can include, for example: (a) obtaining grooming operation scheduling data specifying a schedule of grooming operations performed by at least first and second layers of the plurality of layers; (b) identifying, using data of grooming operation scheduling data, at least one gap in the execution of scheduled operations performed by the storage system; (c) moving an execution time of one or more grooming operation of the grooming operations into said at least one gap; and (d) repeating steps (a) to (c) to adapt to a changing usage pattern of said storage system.

Shortcomings of the prior art are overcome, and additional advantages are provided, through the provision, in one aspect, of a method. The method can include, for example: (a) collecting a grooming operation schedule from said storage controller and applications in said storage system; (b) maintaining in a grooming operation registry grooming operations data for grooming operations which include grooming operations by the storage controller and the applications performed by different layers within said storage system, the grooming operations data including for a plurality of grooming operations, schedule data and performance impact data; (c) providing a timetable comprising execution times for periodic operations of the unified storage system; (d) identifying at least one gap in said timetable using data of the performance impact data; (e) moving an execution time of one or more grooming operation of the plurality of grooming operations specified in said grooming operation registry into said gap; and (f) repeating steps (a) to (e) to adapt to a changing usage pattern of said storage system.

In another aspect, a computer program product can be provided. The computer program product can include a computer readable storage medium readable by one or more processing circuit and storing instructions for execution by one or more processor for performing a method. The method can include, for example: (a) collecting a grooming operation schedule from said storage controller and applications in said storage system; (b) maintaining in a grooming operation registry grooming operations data for grooming operations which include grooming operations by the storage controller and the applications performed by different layers within said storage system, the grooming operations data including for a plurality of grooming operations, schedule data and performance impact data; (c) providing a timetable comprising execution times for periodic operations of the unified storage system; (d) identifying at least one gap in said timetable using data of the performance impact data; (e) moving an execution time of one or more grooming operation of the plurality of grooming operations specified in said grooming operation registry into said gap; and (f) repeating steps (a) to (e) to adapt to a changing usage pattern of said storage system.

In a further aspect, a system can be provided. The system can include, for example a memory. In addition, the system can include one or more processor in communication with the memory. Further, the system can include program instructions executable by the one or more processor via the memory to perform a method. The method can include, for example: (a) collecting a grooming operation schedule from said storage controller and applications in said storage system; (b) maintaining in a grooming operation registry grooming operations data for grooming operations which include grooming operations by the storage controller and the applications performed by different layers within said storage system, the grooming operations data including for a plurality of grooming operations, schedule data and performance impact data; (c) providing a timetable comprising execution times for periodic operations of the unified storage system; (d) identifying at least one gap in said timetable using data of the performance impact data; (e) moving an execution time of one or more grooming operation of the plurality of grooming operations specified in said grooming operation registry into said gap; and (f) repeating steps (a) to (e) to adapt to a changing usage pattern of said storage system.

Shortcomings of the prior art are overcome, and additional advantages are provided, through the provision, in one aspect, of a method. The method can include, for example: (a) obtaining metrics data from at least first and second layers of the plurality of layers; (b) identifying, using data of the metrics data, at least one gap in the execution of scheduled operations performed by the storage system; (c) moving an execution time of one or more grooming operation of the plurality of grooming operations specified into said at least one gap; and (d) repeating steps a) to c) to adapt to a changing usage pattern of said storage system.

In another aspect, a computer program product can be provided. The computer program product can include a computer readable storage medium readable by one or more processing circuit and storing instructions for execution by one or more processor for performing a method. The method can include, for example: (a) obtaining metrics data from at least first and second layers of the plurality of layers; (b) identifying, using data of the metrics data, at least one gap in the execution of scheduled operations performed by the storage system; (c) moving an execution time of one or more grooming operation of the plurality of grooming operations specified into said at least one gap; and (d) repeating steps a) to c) to adapt to a changing usage pattern of said storage system.

In a further aspect, a system can be provided. The system can include, for example a memory. In addition, the system can include one or more processor in communication with the memory. Further, the system can include program instructions executable by the one or more processor via the memory to perform a method. The method can include, for example: (a) obtaining metrics data from at least first and second layers of the plurality of layers; (b) identifying, using data of the metrics data, at least one gap in the execution of scheduled operations performed by the storage system; (c) moving an execution time of one or more grooming operation of the plurality of grooming operations specified into said at least one gap; and (d) repeating steps a) to c) to adapt to a changing usage pattern of said storage system.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
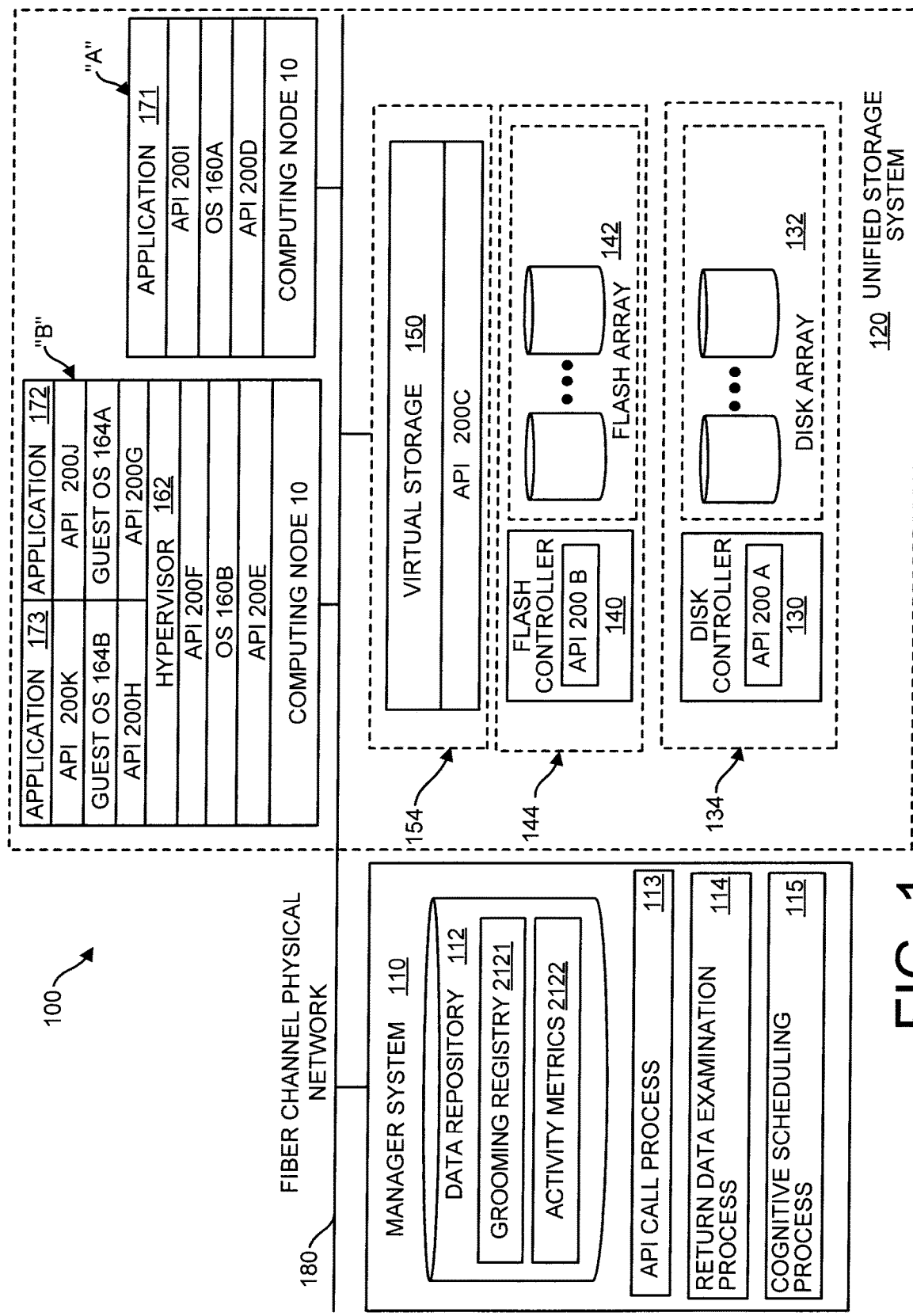
FIG. 1 depicts a system having a manager system and a unified storage system according to one embodiment.

FIG. 1 illustrates system 100 having unified storage system 120 and manager system 110. Unified storage system 120 can include a complete I/O stack from an application layer to a physical storage layer. In the described embodiment of FIG. 1, unified storage system 120 can include storage device provided by disk array 132 defining a first physical storage layer, a storage device provided by a flash array 142 defining a second physical storage layer, virtual storage 150 defining a virtual storage layer, a computing node stack at A, and a computing node stack at B.

Regarding the computing node stack at A, the computing node stack at A can include computing node 10 provided by a physical computing node, operating system (OS) 160A, and application 171.

Regarding the computing node stack at B can include computing node 10 provided by a physical computing node, operating system (OS) 160B, and hypervisor 162. Hypervisor 162 can support a plurality of guest OS, e.g. guest OS 164A and guest OS 164B. Guest OS 164A can support application 172 and guest OS 164B can support application 173. Applications can be e.g. databases, big data analysis applications, or other applications.

Unified storage system 120 can provide storage access at a block level and/or at a file level. Unified storage system 120 can provide consolidated block and file services to clients, physical servers, and virtual servers. Unified storage system 120 can provide block and file services across multiple protocols and can accommodate dual access to both file based storage and block based storage, often through a common interface. Unified storage system 120 according to one embodiment can support different kinds of storage including storage area networks (SANs), fiber channel, and internet small computer system interface (ISCSI) storage. Unified storage system 120 can also accommodate file based storage methods such as network attached storage scenarios (NAS). A SAN can provide a secure highspeed data transfer that provides access to consolidated block level storage. A SAN makes a network of storage devices accessible to multiple servers. SAN devices can appear to a service as attached disk drives.

Virtual storage 150 of unified storage system 120 presents a logical view of physical storage resources to the host systems, e.g. at A and B, treating all storage media (hard disc, optical disc, tape, etc.) in the enterprise as a single pool of storage. The host systems at A and B, virtual storage 150, and manager system 110 can be connected together via network 180, which can include a fiber channel physical network. Unified storage system 120 can provide block access storage and/or file access storage. Block access can be delivered, e.g. over fiber channel, ISCSI, SAS, FICON, or other protocols. File access can be provided using NFS or SMB protocols.

Disk controller 130 can control disk array 132. Disk array 132 can include, e.g. hard disk drives (HDDs). Embodiments herein recognize that grooming maintenance operations performed by storage controllers, such as flash controller 140 and disk controller 130, can potentially disrupt the operation of applications, such as applications 171, 172 and 173.

Flash controller 140 can control flash array 142. Flash array 142 can be provided by a storage infrastructure that contains only flash memory drives, instead of spinning disk drives. Flash array 142 can be provided by a solid state array (SSA).

Embodiments herein recognize that a problem faced by real time applications is suffering sudden latency in an instance of an operation. For example, an application can be issuing a read/write I/O on a storage device and can see latency runs beyond the expectation due to internal grooming operations of a storage controller that are in progress which freezes the I/O. This sometimes leads to application I/O failure and application crashing Embodiments herein recognize that an application I/O performance degradation or failure can occur when a storage controller associated with a storage device is currently performing a maintenance grooming operation such as garbage collection, load balancing, or tiering management.

Embodiments herein recognize that controllers such as flash controller 140 and disk controller 130 as well as other layers (e.g. OS layer, application layer) can routinely perform grooming operations which can interfere with I/O requirements of a running application.

Flash controller 140 at various times can perform garbage collection to keep up the free space of flash array 142 for new write operations. When the garbage collection is started by flash controller 140, it can slow down the I/O because of internal write amplification. If a scheduled loading for a database application is performed when garbage is being collected, loading applications can consume extensive time due to the overhead requirements of the garbage collection.

Various types of application grooming operation requirements can be affected by garbage collection grooming operations and other grooming operations performed at various layers of unified storage system 120. For example, if a scheduled database loading arrives when garbage is being collected a delayed response can occur. In one example, an application can be running a stats generation grooming operation and for performing such grooming operation can be running analytics and can be collecting artifacts for analysis. In this case too, a delayed response can be expected if an internal grooming operation e.g. by a storage controller is in progress.

In one scenario internal storage extent migration in response to application loading can be occurring during a load balancing cycle grooming operation across SSDs of flash array 142. Thus, a storage controller performing a grooming operation can interfere with application I/O loading.

In the case there are multiple types of storage devices, e.g. a disk array 132 and a flash array 142 there is a mechanism which monitoring an access counter of each data element (block or extent) and after some interval moves the extent to faster performing disk tiering. This operation is known as tiering, which can be performed by a combination of disk controller 130 and flash controller 140. Performance of a tiering grooming operation by a plurality of storage controllers can interfere with application I/O loading.

Examples of grooming operations as set forth herein that can be performed by flash controller 140 and/or disk controller 130 can include, e.g. (a) garbage collection to keep free space for new write operations; (b) load balancing; and (c) tiering. In the case that tiering placements are performed across tiers the I/O of the extents can be paused where tiering placement cycle overlaps with the application peak time of a running application. In that case, the applications can suffer I/O latency.

Examples of grooming operations by layers other than load controllers include stat generation grooming operations by an application and package updates by an OS.

Some embodiments herein set forth to organize scheduling of such grooming operations of the storage controllers such as disk controller 130 and/or flash controller 140. Some embodiments herein set forth to organize scheduling of such grooming operations of the storage controllers such as disk controller 130 and flash controller 140 as well as grooming operations of other layers. With organized scheduling, latency attributable to grooming operation requirements of a unified storage system 120 can be reduced.

Appliances of unified storage system 120 include appliance 134 having a combination of disk controller 130 and disk array 132, appliance 144 having a combination of flash controller 140 and flash array 142, and appliance 154 having virtual storage 150. An appliance herein can include a combination of one or more computing node, storage, and software.

Embodiments herein set forth to improve the operation of disk controller 130 and flash controller 140 in the performance of grooming operations performed by storage device controllers such as garbage collection operations, load balancing operations, and tiering operations. Embodiments herein set forth to improve the operation of other layers such as operating system layers and application layers in the performance of grooming operations.

Manager system 110 can include data repository 112 having grooming registry 2121 and activity metrics area 2122. In grooming registry 2121, data repository 112 can store data on grooming operations that can be performed by various layers of unified storage system 120. Grooming operations data of grooming registry 2121 can include schedule data specifying a schedule for performing grooming operations at various layers. Grooming operations data of grooming registry 2121 can include performance data specifying performance impact data associated to each grooming operation. Manager system 110 can provide such performance impact data associated to each grooming operation using e.g. obtained metrics data and/or service specification data. Grooming registry 2121 can include data specifying the performance impact of each specified grooming operation, e.g. a grooming operation performed by a storage controller or at an upper level. Based on data returned by running of API call process 113, manager system 110 can update grooming registry 2121.

Grooming operations can be performed for example by disk controller 130 and/or flash controller 140. Grooming operations performed by disk controller 130 and/or flash controller 140 can include, e.g. garbage collection operations. Grooming operations performed by disk controller 130 and/or flash controller 140 can also include load balancing grooming operations. An example of a grooming operation that can be performed by disk controller 130 in combination with flash controller 140 is a tiering operation.

Grooming operations can be performed by other layers of unified storage system 120. For example, grooming operations can be performed by an application layer. In one example, a database application, e.g. provided by application 171, 172, and or 173 a grooming operation can be run by a database application and can be provided by stats generating grooming operations. An application can run a stats generation grooming operation to create the best execution plan for a query.

A grooming operation that can be performed by an operating system (OS), e.g. OS 160A or OS 160B can include for example a package updates grooming operation.

Activity metrics area 2122 can store data on the impact of grooming operations and other scheduled or unscheduled operations running on unified storage system 120. In one embodiment activity metrics area 2122 can include a table that can be updated hourly or at other intervals. For example, metrics can be obtained from each of a plurality of layers of unified storage system 120 on an iterative basis. In some embodiments, metrics can be applied to a function to return an overall I/O activity level for unified storage system 120. For obtaining metrics stored in activity metrics area 2122 manager system 110 can run API call process 113.

Manager system 110 can run various processes including API call process 113, return data examination process 114, and cognitive scheduling process 115.

Manager system 110 running API call process 113 can call various application program interfaces (APIs) of unified storage system 120 which can be provided at various layers of the I/O stack defining unified storage system 120. Data calls can include calls for metrics data and/or calls for operation scheduling data such as grooming operation scheduling data. Manager system 110 running return data examination process 114 can examine return metrics data returned by running of API call process 113.

Manager system 110 running API call process 113 can return grooming operation scheduling data of various layers of unified storage system 120 in addition to metrics data. Manager system 110 can use such returned grooming operation scheduling data and/or returned metrics data to update grooming operation registry 2121.

Manager system 110 running cognitive scheduling process 115 can cognitively schedule grooming operations performed by various layers of unified storage system 120. For performing of cognitive scheduling manager system 110 can identify expected periods of relatively lower I/O activity level in unified storage system 120 can schedule grooming operations to be performed in the relatively lower I/O activity level periods.

Figure 2:
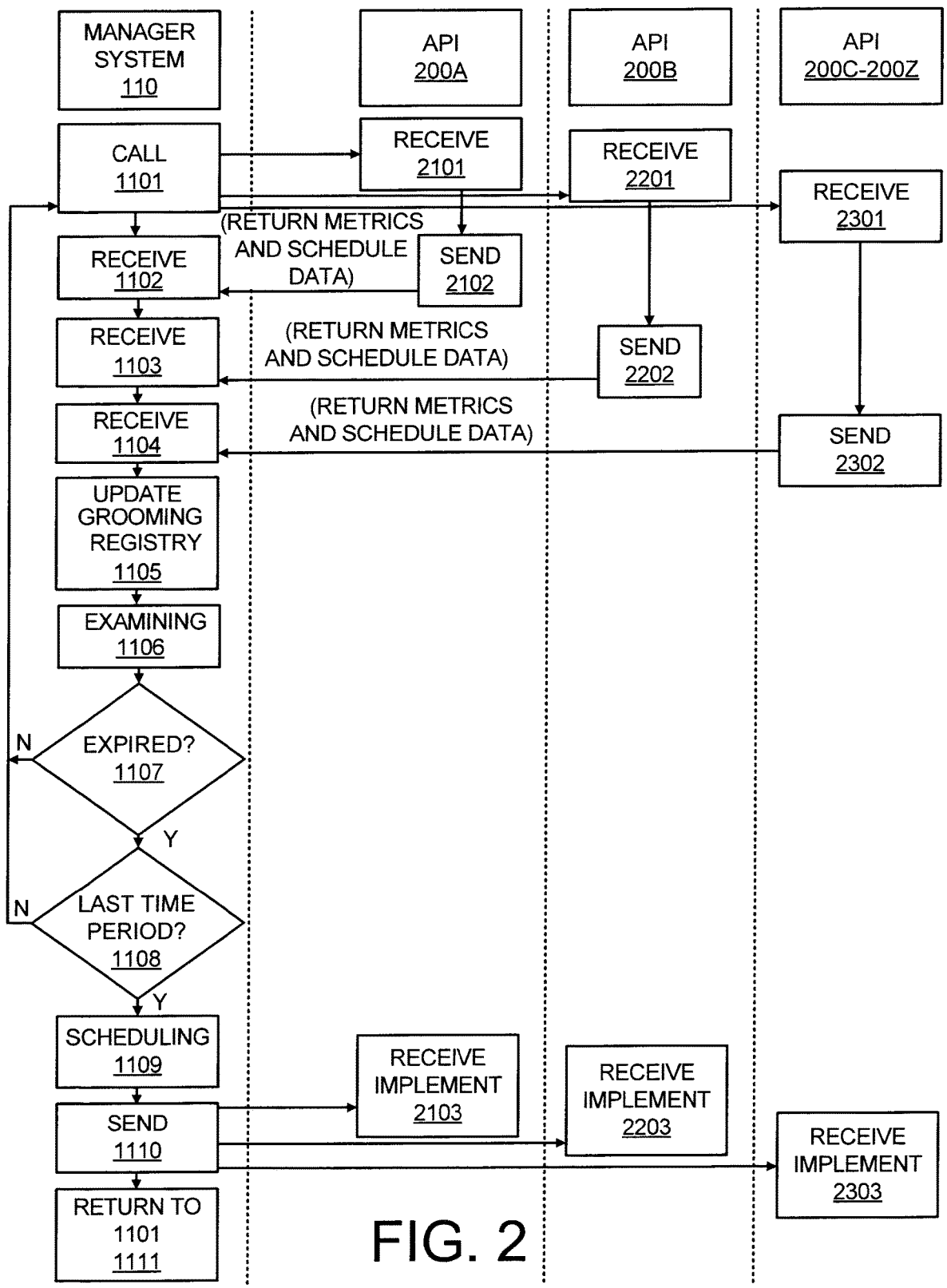
FIG. 2 is a flowchart illustrating a method for performance by a manager system interoperating with various APIs according to one embodiment.

API call process 113 is described with reference to the flowchart of FIG. 2 illustrating manager system 110 interoperating with API 200A, API 200B, and APIs 200C-200Z.

For providing data of activity metrics area 2122, manager system 110 can run API call process 113. Manager system 110 running API call process 113 is described further in reference to FIG. 2. Manager system 110 at block 1101 can call various APIs of unified storage system 120. Various layers of unified storage system 120 can include associated APIs from which metrics data can be called. Disk controller 130 can include associated API 200A, flash controller 140 can include associated API 200B, virtual storage 150 can include associated API 200C, OS 160A can have associated API 200D, OS 160B can have associated API 200E, hypervisor 162 can have associated API 200F, guest OS 164A can have associated API 200G, guest OS 164B can have associated API 200H, application 171 can have associated API 200I, application 172 can have associated API 200J, and application 173 can have associated 200K.

Referring to the flowchart of FIG. 2, manager system 110 at block 1101 can call for metrics to API 200A, API 200B, and API 200C for receipt by respective APIs 200A, API 200B, and API 200C-200Z at receive blocks 2101, 2201, and 2301 respectively. API 200A can return metrics data at block 2102 for receipt by manager system 110 at receive block 1102. API 200B can return metrics at block 2202 for receipt by manager system 110 at receive block 1103. APIs 200C-200Z can return metrics at block 2302 for receipt by manager system 110 at receive block 1104. At block 1105, manager system 110 can perform examining of the received metrics received at blocks 1102, 1103, and 1104. According to one embodiment, manager system 110 can be configured to perform blocks 1101-1104 at preset intervals, e.g. once per minute once per each six minutes, once every ten second, once per hour or at another configurable interval. Received metrics according to one embodiment are set forth in Table A.

At block 1102 manager system 110 according to one embodiment can collect metrics data from API 200A (disk controller) provided by a fragmentation metrics data. Manager system 110 at block 1103 can receive from API 200B (flash controller) a metric provided by a wear level metrics data. Manager system 110 at block 1104 can receive from API 200C free space metrics data. Manager system 110 at block 1101 can receive from API 200D-200E a swap space metrics data. Manager system 110 at block 1104 can receive from hypervisor API 200F a number of virtual machines metrics data. Manager system 110 at block 1104 can receive from guest OS APIs 200G-200H a file system type metrics data. Manager system 110 at block 1104 can receive from application APIs 200I-200K application database write metric s data.

A summary of metrics data that can be obtained from APIs 200A-200K are depicted in Table A.

TABLE A

| API | Type/layer | Metrics Data Collected |
| --- | --- | --- |
| 200A | Disk Controller | Fragmentation |
| 200B | Flash Controller | Wear level |
| 200C | Virtual Storage | Free space |
| 200D-E | OS | Swap space |
| 200F | Hypervisor | Number of virtual machines |
| 200G-H | Guest OS | File system type |
| 200I-K | Application | Application database write |

At blocks 1102-1104 data can be received by manager system 110 in addition to or in place of return metrics data. Data received at blocks 1102-1104 from APIs 200A-200Z can include returned grooming operation scheduling data in addition to returned metrics data.

For obtaining grooming operation scheduling data, sent API data calls sent at block 1101 can include data calls on a cron table (crontab) file associated with each layer of unified storage system 120. The software utility cron is a time-based job scheduler in Unix-like computer operating systems. Unified storage system 120 can use cron to schedule jobs (commands or shell scripts) to run periodically at fixed times, dates, or intervals. Cron can be used to automate system maintenance or administration grooming operations though its general-purpose nature makes it useful for e.g. downloading files from the Internet and downloading email at regular intervals. Cron is driven by a crontab file, a configuration file that can specify shell commands to run periodically on a given schedule.

Returned grooming operation scheduling data returned at blocks 1102-1104 can include returned data returned by processing of respective crontab files associated to each layer.

At block 1105 manager system 110 can update grooming operation registry 2121 based on returned scheduling operation data received at blocks 1102-1104. For example, scheduled grooming operations of unified storages system 120 (as specified in crontab files of various layers) can be regularly changed due to process operation (e g running of cognitive scheduling process 115) or due to administrator user action. Manager system 110 is able to track such changes by processes depicted at blocks 1102-1105.

At block 1106 manager system 110 can perform examining of received metrics data received at block 1102-1104. For examining metrics data, manager system 110 according to one embodiment can apply the formula as set forth in Eq. 1. The formula of Eq. 1 is set forth as follows.

$$S = F_1 W_1 + F_2 W_2 + F_3 W_3 + F_4 W_4 + F_5 W_5 + F_6 W_6 + F_7 W_7 \quad \text{(Eq. 1)}$$

Where $F_1$-$F_7$ are factors and $W_1$-$W_7$ are weights associated to the various factors. According to Eq. 1, S is an overall I/O activity level value for a given time period or time segment. Alternate formulas according to Eq. 1 can be applied having a fewer number of factors (e.g. one factor in one embodiment) or a greater number of factors.

$F_1$ is an activity level associated to a received fragmentation metric received at block 1102 from API 200A associated to disk controller 130. A relatively high activity level value can be applied under factor $F_1$ in the case of higher values of fragmentation. A relatively low activity level value can be applied under factor $F_1$ in the case of lower values of fragmentation.

Regarding factor $F_2$, factor $F_2$ is an I/O activity level factor associated to a wear level metric returned at block 1103 from API 200B associated to flash controller 140. A relatively high activity level value can be applied under factor $F_2$ in the case there is a relatively high wear level metric value and a relatively low activity level value can be applied under factor $F_2$ in the case there is a relatively low wear level activity value according to factor $F_2$.

Factor $F_3$ is a free space I/O activity level factor associated with a free space metric, returned at block 1104 from API 200C associated to virtual storage 150. A relatively high activity value can be applied under factor $F_3$ in the case the free space metric indicates a relatively small amount of free space and a relatively low activity level value under factor $F_3$ can be applied if the free space indicates a relatively high amount of free space.

Regarding factor $F_4$, factor $F_4$ is an I/O activity level factor associated with a swap space metric received at block 1104 from APIs 200D and 200E associated to OS 160A and 160B respectively. A relatively low activity value can be applied under factor $F_4$ in the case the swap space metric indicates a relatively small amount of swap space and a relatively high activity value can be applied under factor $F_4$ in the case the swap space metric indicates a relatively large amount of swap space.

Factor $F_5$ is an I/O activity level factor associated to a number of virtual machines metric as set forth in Table A which can be received from API 200F associated to hypervisor 162. Under factor $F_5$, a relatively high activity level value can be applied in the case that there are relatively larger number of virtual machines and a relatively lower value can be applied under factor $F_5$ in the case there are a fewer numbers of virtual machines.

Regarding factor $F_6$, factor $F_6$ is a file system type activity factor associated to file system type metric which can be received at block 1104 from. A first activity level under factor $F_6$ can be applied in the case there is a first file system type associated to the guest OS and a second activity level can be applied in the case there is a second file system specified in the return metrics data returned from APIs 200G-200H.

Regarding factor $F_7$, factor $F_7$ is an application database write related activity factor associated to the application database write metrics returned from APIs 200I-200K. Manager system 110 can apply a relatively high activity level value under factor $F_7$ in the case there are a relatively high number of application database writes, in accordance with the application database write metrics and where the application database write metrics indicate a relatively larger number of application database writes a relatively larger activity value can be applied under activity factor $F_7$ of Eq. 1.

At block 1106, manager system 110 can determine whether a current time period has expired and at block 1107 manager system 110 can determine whether a current time period is a last time period in a reporting period. For example, reporting periods can be provided by once per day reporting periods and time periods can include 24 one hour time periods within a day long reporting period.

If the current time period has not expired or if the current data examining period is not the last time period of a reporting period, manager system 110 can return to block 1101 to call APIs 200A-200Z and then subsequently receive data at blocks 1102-1105. Manager system 110 can be configured to perform a call for metrics and scheduling data at block 1101, e.g. once or more per time period. Manager system 110 can make more than one call for metrics data and/or scheduling data per time period, e.g. at time segments occurring every minute or every 6 minutes or every 10 minutes during an hour long time period. Manager system 110 at examining block 1106 can store returned metrics data received at blocks 1102-1104 as well as I/O activity level data returned at block 1106 into activity metrics area 2122 of data repository 112. Manager system 110 can store metrics data and activity level data for each time segment within a time period and for each time period (e.g. the time period values can be determined by averaging). For each instance of examining performed at block 1106 manager system 110 can store into activity metrics area 2122 received metrics data returned metrics data and returned activity level data and over time. Over a 24 hour period of time manager system 110 can accumulate a sequence of per time segment and per time periods activity level values for a given reporting period (e.g. a day).

At block 1108, on determining that a current period is a last time period of a reporting period, manager system 110 can proceed to block 1109 to perform scheduling based on metrics data received at blocks 1102-1104 and processed to provide activity level data at block 1106.

Manager system 110 can run cognitive scheduling process 115 (FIG. 1) at block 1108. Manager system 110 running cognitive scheduling process 115 can include manager system querying data from metrics area 2122 and/or grooming registry 2121.

Figure 3:
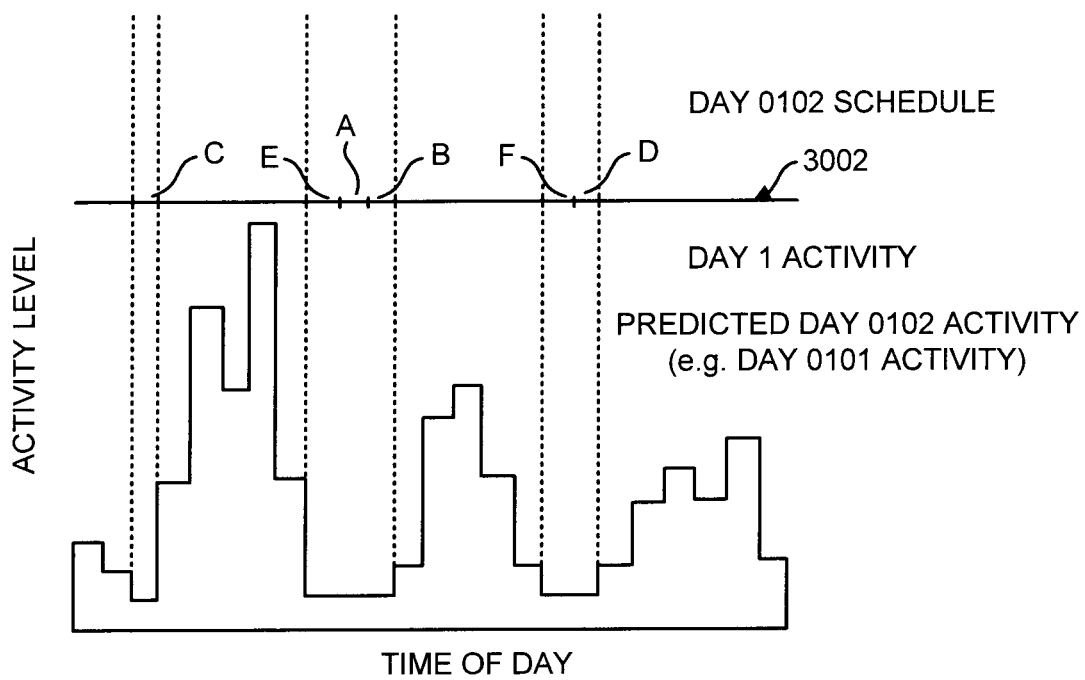
FIG. 3 depicts scheduling of grooming operations based on examining of metrics data of a unified storage system according to one embodiment.

With reference to FIG. 3, operations of manager system 110 running cognitive scheduling process 115 according to one embodiment is described. FIG. 3 depicts I/O activity levels plotted at various time periods, e.g. once per hour in accordance with the method described in connection with block 1105. The plotted I/O activity data can be activity data recorded into activity metrics area 2122 of data repository 112. FIG. 3 depicts activity level attributable to application loading in unified storage system 120 over the course of a day, e.g. day 0101.

As seen with reference to FIG. 3, the I/O activity levels define periods of higher activity and lower activity. Manager system 110 at block 1107 can perform scheduling so that a set of grooming operations of unified storage system 120 can be performed at select time periods, e.g. time periods of lower activity level characterized by I/O activity level falling below a threshold to define a "gap" in scheduled operations of unified storage system 120. In one embodiment, grooming operations A-G can be performed by various layers of unified storage system 120. In the following Table B, various grooming operations for performance by various layers of unified storage system 120 are described.

TABLE B

| Grooming Operation | Description |
| --- | --- |
| A | Garbage Collection Grooming Operation by Disk Controller 130 |
| B | Garbage Collection Grooming Operation by Flash Controller 140 |
| C | Tiering Grooming Operation by Disk Controller 130 and Flash Controller 140 |
| D | Load Balancing Grooming Operation by Disk Controller 130 |
| E | Load Balancing Grooming Operation by Flash Controller 140 |
| F | Packages Updates Grooming Operation by OS 164A |
| G | Stat Generation Grooming Operations by respective applications 171, 172, 173 (or other application layer grooming operations such as database vacuuming grooming operations, rebuilding indexes grooming operations, sorting content of data files grooming operations) |

Referring to Table B, grooming operation A is a garbage collection grooming operation performed by disk controller 130, grooming operation B is a garbage collection grooming operation performed by flash controller 140 with respect to flash array 142. Grooming operation C is a tiering grooming operation performed by disk controller 130 in combination with flash controller 140. Grooming operation D is a load balancing grooming operation performed by flash controller 140. Grooming operation E is a load balancing grooming operation performed by flash controller 140. Grooming operation F is a grooming operation of packages updates performed by an OS, e.g. OS 164A or OS 164B. Grooming operation G is a stats generation grooming operation performed by a database application of unified storage system 120, e.g. which can be provided by application 171, 172, or 173 (or other application layer grooming operations such as database vacuuming grooming operations, rebuilding indexes grooming operations, sorting content of data files grooming operations).

Referring to timetable 3002 depicted in FIG. 3, manager system 110 at scheduling block 110 can schedule timing of grooming operations A-F at selected time periods over the course of a day that are timed in relation to a predicted activity level pattern of unified storage system 120. Manager system 110 running cognitive scheduling process 115 (FIG. 1) according to one embodiment can schedule lower layer grooming operations (e.g. by an operating system or storage controller) for mitigating conflict with operations of one or more application e.g. application 171, 172, or 173. Manager system 110 for mitigating conflict can reduce or eliminate conflict.

In reference to timetable 3002, manager system 110 can return adjusted schedules for grooming operations A-F for mitigated conflict with high activity periods of unified storage system 120. For example, timetable 3002 depicts a schedule for grooming operations provided for mitigated conflict with high activity level periods of unified storage system 120. In the described example, application dependent I/O activity levels can be assumed to have common elements between successive days.

FIG. 3 depicts a predicted activity level pattern for day 0102 plotted with a day 0102 grooming schedule provided by manager system 110 running cognitive scheduling process 115. According to one embodiment, manager system 110 can predict a current day's activity level in dependence on a prior day's activity level pattern. According to one embodiment, manager system 110 can use a prior day's activity level pattern as a prediction of a next day's activity level pattern.

Accordingly, in reference to FIG. 3 data on application dependent I/O activity levels on a first day (day 0101) can be used for scheduling grooming operations occurring on a next day. That is day 0102 grooming operations can be scheduled based on day 0101 I/O activity levels according to the assumption that activity levels can have common elements between successive days.

Referring to the grooming operations A-F that are specified in timetable 3002, manager system 110 can schedule grooming operations as depicted in timetable 3002 so as to mitigate conflict with high activity level periods predicted for day 0102, where the predicted day 0102 activity levels are predicted based on day 0101 activity levels (and in one embodiment where the day 0101 activity level pattern is used as the predictor of the day 0102 activity level pattern).

For scheduling of a lower layer (below application layer) grooming operation manager system 110 can ascertain activity levels for time periods within a reporting period and can identify predicted lowest activity level time periods e.g. activity levels falling below a threshold which define "gaps" in schedules operations of unified storage system 120. Manager system 110 according to one embodiment can assume that activity periods are dominated by operations of applications 171-173 including scheduled grooming operations, other scheduled operation of applications, and unscheduled operations of applications. Scheduled application layer grooming operations can include e.g. stats generation, database vacuuming, rebuilding indexes, sorting content of data files, and the like. Manager system 110 can store in grooming registry 2121 schedule data for grooming operations as updated at block 1105 and performance impact data of various grooming operations, including start and end time of grooming operations and associated I/O activity levels. The performance impact data according to one embodiment can be defined by historical data stored in grooming registry 2121 that specifies performance attributes of grooming operations during past instances. Performance impact data of various grooming operations in addition or alternatively can be defined by historical data of activity metrics area 2122 which records historical metrics data indicating impact of various grooming operations and historical activity level data indicating impact of various historical grooming operation instances. In some embodiments the contents of activity metrics area 2122 can be shared with grooming registry 2121 so that grooming registry 2121 can include activity metrics area 2122. Performance impact data of grooming operations in addition or alternatively can be provided by product specification data e.g. as provided by a manufacturer or can be specified by an administrator user.

Manager system 110 can schedule lower layer grooming operations automatically in the described embodiment for mitigation of conflict with high activity periods of unified storage system 120, e.g. can schedule lower layer grooming operations based on the time durations of the grooming operations as determined from grooming registry 2121 for mitigated conflict with relatively high activity periods of unified storage system 120.

Figure 4:
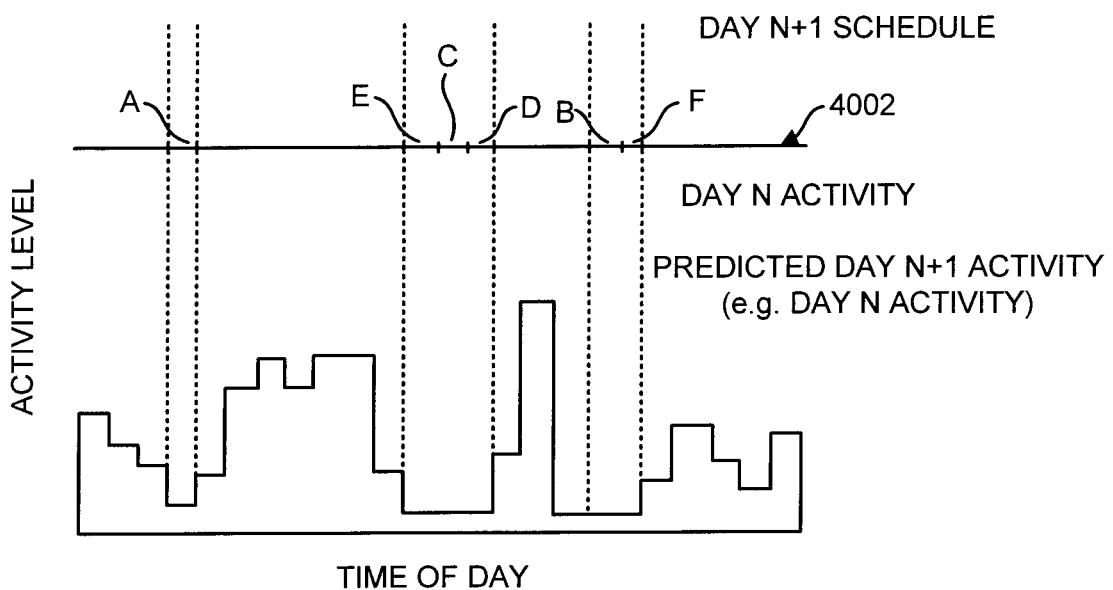
FIG. 4 depicts scheduling of grooming operations based on examining of metrics data of a unified storage system according to one embodiment.

There is set forth herein according to one embodiment a method for organizing execution of grooming operations in a storage system having an I/O stack including a plurality of layers, the method comprising: a) obtaining metrics data from at least first and second layers of the plurality of layers; b) identifying, using data of the metrics data, at least one gap in the execution of scheduled operations performed by the storage system; c) moving an execution time of one or more grooming operation of the plurality of grooming operations specified into said at least one gap; and d) repeating steps a) to c) to adapt to a changing usage pattern of said storage system. In one embodiment identifying at least one gap can include examining schedule data to identify times at which there are no grooming operations being performed. In one embodiment identifying at least one gap can include examining predicted activity level for a period being subject to scheduling to identify times at which activity level falls below a threshold as depicted in FIGS. 3 and 4. Providing a predicted I/O activity level for unified storage system 120 can include using performance impact data for grooming operations stored in grooming registry 2121 which can include activity metrics area 2122. The performance impact data can include historical data derived in dependence on historical instances of grooming operations.

There is set forth herein according to one embodiment a method for organizing execution of grooming operations by a storage controller for a storage device of a storage system, comprising the steps of: a) collecting a grooming operation schedule from said storage controller and applications in said storage system; b) maintaining in a grooming operation registry grooming operations data for grooming operations which include grooming operations by the storage controller and the applications performed by different layers within said storage system, the grooming operations data including for a plurality of grooming operations, schedule data and performance impact data; c) providing a timetable comprising execution times for periodic operations of the unified storage system; d) identifying at least one gap in said timetable using data of the performance impact data; e) moving an execution time of one or more grooming operation of the plurality of grooming operations specified in said grooming operation registry into said gap; and f) repeating steps a) to e) to adapt to a changing usage pattern of said storage system. In one embodiment identifying at least one gap can include examining schedule data to identify times at which there are no grooming operations being performed. In one embodiment identifying at least one gap can include examining predicted activity level for a period being subject to scheduling to identify times at which activity level falls below a threshold as depicted in FIGS. 3 and 4. Providing a predicted I/O activity level for unified storage system 120 can include using performance impact data for grooming operations stored in grooming registry 2121 which can include activity metrics area 2122. The performance impact data can include historical data derived in dependence on historical instances of grooming operations.

There is set forth herein according to one embodiment a method for organizing execution of grooming operations in a storage system having an I/O stack including a plurality of layers, the method comprising: a) obtaining grooming operation scheduling data specifying a schedule of grooming operations performed by at least first and second layers of the plurality of layers; b) identifying, using data of grooming operation scheduling data, at least one gap in the execution of scheduled operations performed by the storage system; c) moving an execution time of one or more grooming operation of the plurality of grooming operations specified into said at least one gap; and d) repeating steps a) to c) to adapt to a changing usage pattern of said storage system. In one embodiment identifying at least one gap can include examining schedule data to identify times at which there are no grooming operations being performed. In one embodiment identifying at least one gap can include examining predicted activity level for a period being subject to scheduling to identify times at which activity level falls below a threshold as depicted in FIGS. 3 and 4. Providing a predicted I/O activity level for unified storage system 120 can include using performance impact data for grooming operations stored in grooming registry 2121 which can include activity metrics area 2122. The performance impact data can include historical data derived in dependence on historical instances of grooming operations.

According to one embodiment, manager system 110 can schedule lower layer grooming operations A-F to mitigate conflict with higher I/O activity periods of unified storage system 120 as depicted in FIG. 3. While FIG. 3 depicts manager system 110 scheduling lower layer grooming operations for mitigation of conflict with overall high I/O activity levels presumed to be dominated by application layer operations, manager system 110 alternatively or in addition at block 1109 can return application layer grooming schedule data so that application layer grooming operations are tuned for conflict mitigation with lower layer grooming operations.

At block 1110 manager system 110 can initiate the grooming operations determined at scheduling block 1109. Manager system 110 initiating grooming operations can include manager system 110 at block 1110 sending communications for receipt by API 200A, API 200B, and APIs of APIs 200C-200Z associated with the scheduled grooming operations A-G as set forth herein. The communications can include grooming schedule data for use in updating crontab files at the various layers of unified storage system 120. The layers associated with the respective APIs of APIs 200A-200Z can responsively implement specified grooming operations in response to the respective communications received at block 2103, 2203, and 2303. For example APIs of APIs 200A-200Z can update their respective crontab files for re-schedule of scheduled grooming operations in response to received scheduling data received at block 2103, 2203, and 2303.

At block 1111, manager system 110 can return to block 1101 and can perform blocks 1102-1105 to examine metrics for a new reporting period having a plurality of time periods, e.g. a next day segmented into 24 one hour time periods which time periods can be further segmented into time segments.

FIG. 4 depicts activity levels of unified storage system 120 at day N subsequent to day 0101. Referring to FIG. 4, unified storage system 120 can include a different activity profile relative to the activity profiles shown in FIG. 3 due to changing conditions of unified storage system 120. Manager system 110 at block 1107 can schedule grooming operations A-G as set forth in reference to FIG. 4 in respect to timetable 4002. So again, in reference to timetable 4002, manager system 110 can schedule grooming operations A-F for mitigating conflict with higher I/O activity level periods of unified storage system 120.

In the embodiments of FIGS. 3 and 4, manager system 110 can provide a predicted I/O activity level for a day based on the previous day's I/O activity level, e.g. in the described example can predict that a current day's activity level will be in common with a prior day's I/O activity level.

Figure 5:
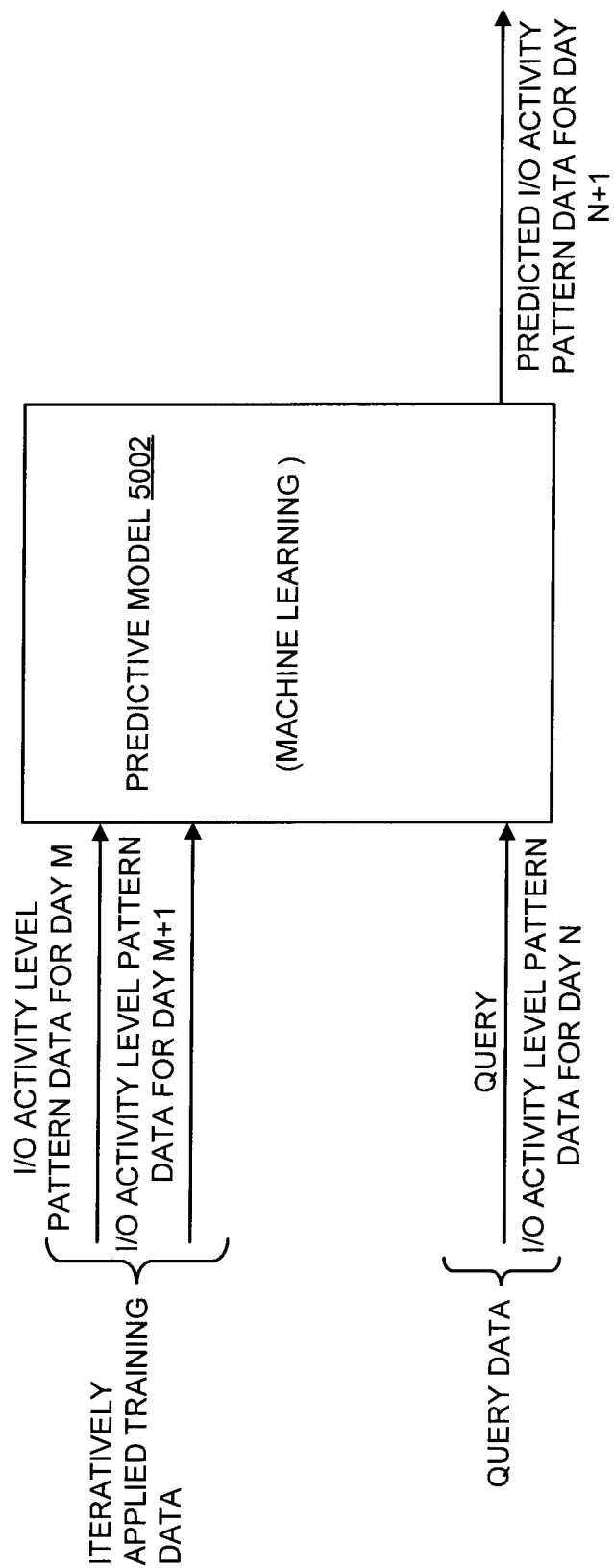
FIG. 5 depicts a machine learning process according to one embodiment.

In another embodiment, manager system 110 can train a predictive model using machine learning processes to provide predictions on a current day's activity level. According to one embodiment, manager system 110 can train predictive model 5002 as shown in FIG. 5 by machine learning, wherein predictive model 5002 predicts a current day's hourly activity level (e.g. as shown for day 0101 in FIG. 3) based on a prior day's hourly I/O activity level. For training of predictive model 5002 by machine learning, manager system 110 can iteratively apply as training data to predictive model 5002, actual hourly I/O activity level patterns for successive days. By such training predictive model 5002 is able to learn relationships between hourly I/O activity level patterns of successive days. On being trained predictive model 5002 can respond to a query. The query can be a set of values defining hourly I/O activity levels of for unified storage system 120 for a prior day. The trained predictive model 5002 can output a predicted set of values defining hourly I/O activity levels. In such an embodiment with reference to FIGS. 3 and 4, manager system 110 can coordinate the scheduling of grooming processes in the manner depicted in FIGS. 3 and 4 except that a predicted I/O activity level can be predicted by a machine learning trained predictive model 5002 that responds to a data query provided by a prior day's hourly I/O activity level. Such a predictive model 5002 can be trained using training data provided by first and second hourly I/O activity level patterns for unified storage system 120 for first and second days, wherein the first and second days are successive to one another.

A method in which manager system 110 predicts a current day's I/O activity level based on a prior day's activity level pattern, with or without use of predictive model 5002, can be absent of manager system 110 using grooming schedule data of grooming registry 2121 for performance of predictions.

In other embodiments, manager system 110 can perform predictions as to activity levels using grooming schedule data of grooming registry 2121. In grooming registry 2121 manager system 110 can store historical data specifying the impact of running respective grooming operation on unified storage system 120 in past iterations.

In Table C there is depicted contents of grooming registry 2121 according to one embodiment.

TABLE C

| Grooming Operation | Day | Schedule Data | Start Segment | End Segment | Activity Level Data |
|---|---|---|---|---|---|
| A | 0099 | XXXX | XXXX | XXXX | XXXXXXXX |
| A | 0100 | XXXX | XXXX | XXXX | XXXXXXXX |
| A | 0101 | XXXX | XXXX | XXXX | XXXXXXXX |
| A | 0102 | XXXX | XXXX | | |
| . | . | . | . | . | . |
| . | . | . | . | . | . |
| . | . | . | . | . | . |
| B | 0099 | XXXX | XXXX | XXXX | XXXXXXXX |
| B | 0100 | XXXX | XXXX | XXXX | XXXXXXXX |

TABLE C-continued

| Grooming Operation | Day | Schedule Data | Start Segment | End Segment | Activity Level Data |
|---|---|---|---|---|---|
| B | 0101 | XXXX | XXXX | XXXX | XXXXXXXX |
| B | 0102 | XXXX | XXXX | | |
| . | . | . | . | . | . |
| . | . | . | . | . | . |
| . | . | . | . | . | . |

For each grooming operation, there can be a grooming operation identifier A-G as set forth in Table B (which in a commercial implementation be provided by UUIDs), scheduling data which can be obtained from crontab files a set forth herein (returned data at blocks 1102-1104), start time segments for each instance of the grooming operation that has been performed, a stop time segment for each instance and activity level pattern data for each instance. Recorded historical data can define performance impact data of the various grooming operations. Manager system 110 can iteratively query activity level data of activity metrics area 2122 for providing grooming operation specific activity level data for populating the end segment and the activity level data row entries for each historical grooming operation specific iteration recorded in table C. An end segment can be recorded as the segment at which I/O activity level falls below a threshold. The activity level for a grooming operation can be period specific section taken from the I/O activity pattern stored in activity metrics area 2122. In some cases the recorded activity level can include contributions from multiple operations such as multiple grooming operations.

In the case there are overlapping grooming operations or other scheduled operation of unified storage system 120 the recorded activity level pattern data can include contributions from multiple operations such as multiple grooming operations. Notwithstanding, manager system 110 is able to make use to the recorded historical data of grooming registry 2121 as depicted in Table C, e.g. by searching for periods where a grooming operation was performed without there being overlap with another scheduled operation, or, where there was an overlapping characteristic in common with an overlap characteristic in period for which a schedule is being prepared.

Manager system 110 activating cognitive scheduling process 115 for performing scheduling at block 110 according one embodiment can use data from grooming registry 2121 data of which according to one embodiment is depicted in Table C. According to one embodiment, for predicting I/O activity level for a period of interest for which grooming operations can be scheduled, manager system 110 can query data of grooming registry 2121. Referring to FIGS. 3 and 4 according to one embodiment, manager system 110 can provide predicted day 0102 (FIG. 3) or predicted day N activity level patterns using grooming registry 2121.

Manager system 110 can examine scheduling data for rows of associated to the current day for which grooming operations are being scheduled. Manager system 110 referring to Table C can be scheduling grooming operations for day 0102 (which has not yet occurred) and can read schedule data to grooming operations associated to that day. Referring to Table C, because day 0102 has not occurred end time data and activity level data has not been recorded for that day. Manager system 110 can provide a timetable of grooming operations for day 0102 in an order based on recorded start times for the grooming operation. For each grooming operation of the timetable manager system 110 can use historical data for the grooming operation e.g. of depicted days 0099 and 0100 and 0101 of Table C to predict an activity level for the grooming operation. For each grooming operation of the ordered timetable manager system 110 can determine if the scheduled grooming operation overlaps with N other grooming operation. Where there is no overlap, manager system 110 for providing a prediction of activity level can use activity historical data for instances of the grooming operation where there was also no overlap (e.g. averaging activity level for the historical instances). Where there is an overlap in scheduled grooming operations for day 0102, manager system 110 can use activity level historical data where the same overlapping conditions occurred (e.g. averaging the historical instances). The historical data stored in grooming registry 2121 that specifies performance attributes of grooming operations during past instances can define performance impact data of the grooming operation.

Manager system 110 running cognitive scheduling process 115 to schedule grooming operations can on building a predicted activity level pattern for day 0102 can schedule grooming operations for mitigating conflict between operations of unified storage system 120, e.g. conflict between grooming operations at various layers. For example, manager system 110 can change a start time for a certain lower layer grooming operation so that the certain grooming operation is performed at a time where it does not overlap in time with any other grooming operation performed by manager system 110.

There is set forth herein according to one embodiment a method for organizing execution of grooming operations in a storage system having an I/O stack including a plurality of layers, the method comprising: a) obtaining metrics data from at least first and second layers of the plurality of layers; b) identifying, using data of the metrics data, at least one gap in the execution of scheduled operations performed by the storage system; c) moving an execution time of one or more grooming operation of the plurality of grooming operations specified into said at least one gap; and d) repeating steps a) to c) to adapt to a changing usage pattern of said storage system. In one embodiment identifying at least one gap can include examining schedule data to identify times at which there are no grooming operations being performed. In one embodiment identifying at least one gap can include examining predicted activity level for a period being subject to scheduling to identify times at which activity level falls below a threshold as depicted in FIGS. 3 and 4. Providing a predicted I/O activity level for unified storage system 120 can include using performance impact data for grooming operations stored in grooming registry 2121 which can include activity metrics area 2122. The performance impact data can include historical data derived in dependence on historical instances of grooming operations.

There is set forth herein according to one embodiment a method for organizing execution of grooming operations by a storage controller for a storage device of a storage system, comprising the steps of: a) collecting a grooming operation schedule from said storage controller and applications in said storage system; b) maintaining in a grooming operation registry grooming operations data for grooming operations which include grooming operations by the storage controller and the applications performed by different layers within said storage system, the grooming operations data including for a plurality of grooming operations, schedule data and performance impact data; c) providing a timetable comprising execution times for periodic operations of the unified storage system; d) identifying at least one gap in said timetable using data of the performance impact data; e) moving an execution time of one or more grooming operation of the plurality of grooming operations specified in said grooming operation registry into said gap; and f) repeating steps a) to e) to adapt to a changing usage pattern of said storage system. In one embodiment identifying at least one gap can include examining schedule data to identify times at which there are no grooming operations being performed. In one embodiment identifying at least one gap can include examining predicted activity level for a period being subject to scheduling to identify times at which activity level falls below a threshold as depicted in FIGS. 3 and 4. Providing a predicted I/O activity level for unified storage system 120 can include using performance impact data for grooming operations stored in grooming registry 2121 which can include activity metrics area 2122. The performance impact data can include historical data derived in dependence on historical instances of grooming operations.

There is set forth herein according to one embodiment a method for organizing execution of grooming operations in a storage system having an I/O stack including a plurality of layers, the method comprising: a) obtaining grooming operation scheduling data specifying a schedule of grooming operations performed by at least first and second layers of the plurality of layers; b) identifying, using data of grooming operation scheduling data, at least one gap in the execution of scheduled operations performed by the storage system; c) moving an execution time of one or more grooming operation of the plurality of grooming operations specified into said at least one gap; and d) repeating steps a) to c) to adapt to a changing usage pattern of said storage system. In one embodiment identifying at least one gap can include examining schedule data to identify times at which there are no grooming operations being performed. In one embodiment identifying at least one gap can include examining predicted activity level for a period being subject to scheduling to identify times at which activity level falls below a threshold as depicted in FIGS. 3 and 4. Providing a predicted I/O activity level for unified storage system 120 can include using performance impact data for grooming operations stored in grooming registry 2121 which can include activity metrics area 2122. The performance impact data can include historical data derived in dependence on historical instances of grooming operations.

Figure 6:
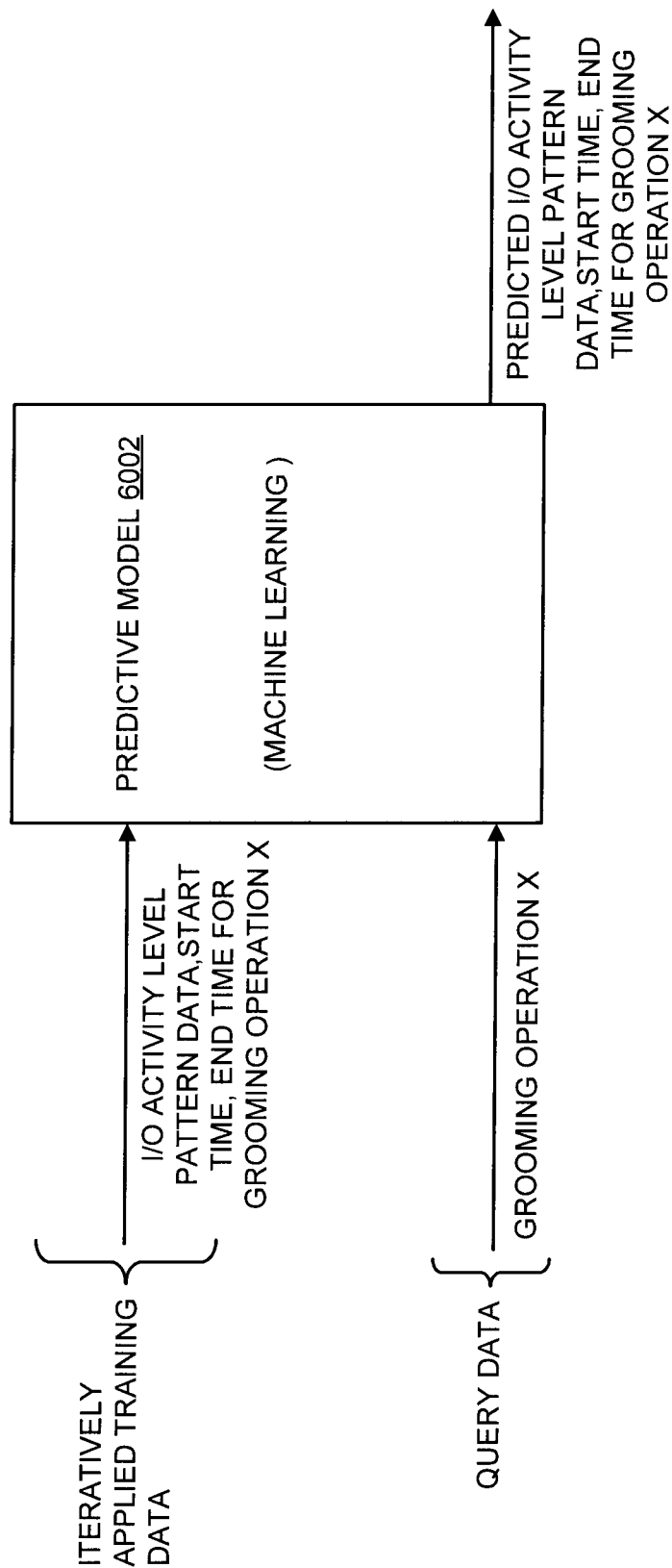
FIG. 6 depicts a machine learning process according to one embodiment.

Predicting I/O activity level patterns can include use of machine learning processes as set forth with reference to FIG. 6. For generating a prediction of I/O activity level system 110 can train and query predictive model 6002 as set forth in FIG. 6. Predictive model 6002 can be trained so that on being queried predictive model 6002 returns predicted activity level for a particular grooming operation being performed. Manager system 110 can provide an instance of predictive model 6002 for each grooming operation being run at each layer of unified storage system 120. Predictive model 6002 can be trained using iteratively applied training data that specifies performance impact data for a grooming operation being performed including duration data and I/O activity, e.g. training data taken from historical start time, end time and activity level data from grooming registry 2121 depicted in Table C according to one embodiment. I/O activity data start time and end time that is applied as training data to be predictive model 6002 can be training data selected so that performance impact data isolates an effect of a single grooming operation. Manager system 110 can determine that effects of a single grooming operation being performed by examining scheduling data of grooming registry 2121. Manager system 110 on being trained is able to respond to a query specifying a certain grooming operation with predicted performance impact data specifying activity level data and activity level duration data resulting from running of the certain grooming operation. Manager system 110 can provide instances of predictive model 6002 for cases where first to Nth grooming operations of unified storage system 120 are run contemporaneously. Manager system 110 can examine data of grooming registry 2121 to determine instances where the particular first to Nth grooming operations are being run contemporaneously and can use returned historical start time end time and activity data as training data for training predictive model 6002 so that on being trained manager system 110 is able to be respond to a query specifying first to Nth grooming operations, manager system 110 responds with predicted performance impact data specifying activity level data an duration data.

Various available tools, libraries, and/or services can be utilized for implementation of predictive model 5002 and predictive model 6002. For example, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Embodiments herein recognize that multiple companies provide a common set of utilities in one physical box. This box often contains some servers to install and run the application desired, one or more SAN switch connected to these servers and storage virtualization appliance along with backend disk subsystems attached to them. A plurality of devices can be connected to the SAN switches provided as part of integrated appliance. Such a unified solution can include complete I/O stack from application layer to IO management layer followed by the actual disk drives where the data and metadata is stored.

Big data analytics applications possess a similar architecture defining a unified storage system 120 wherein the data requirement is more than the normal subsystems. Also, the real-time analytics operations are highly sensitive to the I/O latency hence Flash is more often used to construct these types of solutions. A Flash storage controller can be attached to the servers and underlying backend disks and the system can be provided to virtualize the LUN storage coming from high speed SSD disks (they may possess disks other than SSDs which are used to save less used information and adds more capacity to the overall solution). Flash is highly super performing storage systems containing capability to server with high IO with low latency (e.g, IBM® V9000 Flash-Systems® wherein IBM® and FlashSystems® are registered trademarks of International Business Machines Corporation).

Systems such as IBM® PureData System® for Analytics powered by Netezza® technology contain high speed servers along with interconnected switches for internal fabric and storage virtualization engine to provide high speed, low latency storage (IBM® and PureData System® and Netezza® are registered trademarks of International Business Machines Corporation). This solution often contains Flash storage to provide desired storage capabilities. This analytics appliance provides data warehouse and analytics capabilities with simplified model of administration and usage. This system defining a unified storage system 120 provides intelligence for the users and provides the desired information based on the internal analytics capabilities.

The aforementioned examples of unified storage systems 120 are special type of business applications which are being used to calculate and improve the performance of business operations via analyzing the generated data. More specifically, these applications provide business intelligence by making the analysis of the data generated by various business components. As the raw data has to be analyzed, these types of applications issue significant number of READ I/O operations to collect the data for processing and many WRITE I/Os to save the intermediate data in temporary storage space.

Embodiments herein recognize that a problem faced by real time applications is sudden latency in one of the instances during the operations. I/O latency can occur when the application is issuing READ/WRITE IO on a storage layer and sees latency runs beyond the expectations due to some of the internal operations, e.g. grooming operations that are in progress which freezes I/O to serve during peak time. Application I/O failure and application crash can occur as a consequence.

Embodiments herein recognize that when a scheduled analytics operation is run by an application, the application can collect all the required information from storage; run various database queries and stores intermediate results in the temporary storage space. This can result in high READ/WRITE I/O on an underlying storage virtualization appliance. As the underlying storage subsystem is not expecting sudden I/O operations, it may not be ready to process this I/O and adds additional latency. All the Flash systems can have their own cycles of grooming operations like garbage collection, load balancing and tiering management. In case when one of these cycles are is running and analytics application started issuing heavy I/O, then the application can experience I/O latency.

Embodiments herein recognize that there are various scenarios which freeze I/O processing when the upper layer application demands them. Some of the cases are listed herein which can be addressed by methods herein. As the flash controller is integrated in the appliance to serve the I/O with better latency, it comprised of Solid State Disks (SSDs).

Embodiments herein recognize that according to a basic implementation issue with SSD disks garbage collection is performed to keep the free space for new WRITE operations. When the garbage collection is started, it often slower downs the I/O because internal write amplification. If the scheduled database loading comes when garbage is being collected at backend, the loading operations can consume significant time because of internal garbage collection is in progress. In the above referenced garbage collection, if scheduled analytics application started collecting the artifacts and analysis operation, then in that case too it will expect the delayed response due to internal grooming operation is in progress at storage layers.

Embodiments herein recognize that in case there are multiple types of backend disks that are attached to the storage system, there can be a mechanism which monitors the access counter of each data elements (Block or Extent) and after some interval, moves the extent to faster performing disk tier based on the access count since last cycle. This operation is known as tiering. While the tiering placements are done across the tiers, the I/O of the extents are paused and in the case where tiering placement cycle overlaps with the applications peak time, in that case the application suffers I/O latency. The above-mentioned issue also persists when internal storage extent migration is happening in load balancing cycle across the SSDs in the pool and degrades the performance of the system. All other issues which were not mentioned in the above list which occurs due to the internal storage operations and I/O freezing because of self-grooming activity of the storage controllers can be addressed by methods herein.

Embodiments herein can add to capabilities of an analytics application and underlying storage controller's operation scheduling. Embodiment herein recognize that internal processes cycles of the features running at different layers of overall I/O stack creates the performance issues for analytics applications. There is set forth herein a method and apparatus to monitor and update operations at various layers to improve the performance of a unified storage system 120 including appliances therein.

Embodiments herein can feature monitoring of schedules of operations of applications including analytics grooming operations of applications and other operations of applications. The arrangement of operations identification can be performed by the system using pattern based analysis of application reading configuration details of the applications to know the schedules and I/O expectation, e.g. in terms of I/O activity level as set forth herein. This can also be performed creating static methods to run the jobs for various layers at appliance level.

Embodiments herein can provide an API based solution which collects the details from applications and storage systems and other layers of a unified storage system 120. Once the data is gathered, then operation sequence can be decided to return optimized performance. In case some backend operation is conflicting with the requirement of application workload, then in this case, the backend operation can be preponed or postponed based on the time and situations.

Cognition enabled capabilities can be used to analyze the application I/O requirements and suitably the operations are being piled up for better appliance performance. For communication between analytics application interface and backend storage virtualization controller cluster can be performed either using separate out-of-band protocol or reserved fields in the write CDB (SCSI CDB) can be used OR in case both these capabilities are layers within the same storage controller, they pass this information across layers. For example the storage system IBM® DS8000® implements a mechanism to communicate heat map from one storage system to another (IBM® and DS8000® are registered trademarks of International Business Machines Corporation). This is to ensure that in the mentioned scenario, we want the right data to be in an SSD. Similar implementation can be used when reserved fields of write CDB are used. The SCSI Command Descriptor Block (CDB) mechanism can be used to implement inbound or out-of-bound APIs for communication across the modules of the proposed system wherein CDB are used to exchange the commands across the components which are usually comprised of 6, 10, 12, or 16 bytes based on SCSI standards.

If analytics application X issues scheduled analytics grooming operations at 3 PM every day and issues 100 GB WRITE in temp space for craving insights, a storage controller e.g. 130 or 140 (FIG. 1) in accordance with methods set forth herein can collect garbage and make sure that 100 GB space will be available before the application issues the writes.

Beyond scheduled database application layer operations, e.g. like loading data from SAP every day at 6 AM, there are also scheduled application layer grooming operations like e.g. generating stats for tables (for the system to create the best execution plan for a query, system 100 evaluates what it knows about the database tables that it accesses), or other application layer grooming operations such as database vacuuming grooming operations, rebuilding indexes grooming operations, sorting content of data files grooming operations. Embodiments herein recognize that these also generate significant load on the system, including storage. Accordingly there is set forth herein according to one embodiment a registry of all such "self-grooming" operations, no matter if these are storage originated (like SSD garbage collection), or database originated (like generating stats). In that way optimal time and order can be achieved.

In accordance with features set forth herein application performance degradation due to an internal storage system's operations can be mitigated, e.g. avoided or reduced. Embodiments herein can improve the performance of various layers of operations in unified storage system 120 used for big data and analytics by managing the operation across layers of the I/O stack. Embodiments herein control internal operations of storage systems and effectively tunes them based on application requirement. Embodiments herein dynamically adjusts the operations at various layers which optimizes system performance. Embodiments herein provide ability to control a unified storage system 120 in a way to enable improved software defined storage strategy useful e.g. for big data analytics applications. This method doesn't require any additional space and can be implemented easily using the existing space already available in a unified storage system 120.

In Table D there is depicted a system metadata map illustrating an association of system metadata to application metadata.

Table D: System Metadata map: application metadata.

TABLE D

| Application | Expectation | Peak Times |
|---|---|---|
| SAP | IOPS, Latency | 6 AM-10 AM |
| Application2 | Bandwidth | 12 PM-3 PM |
| Application3 | Latency | 12 AM-1 AM |
| — | — | — |
| — | — | — |
| — | — | — |

In Table E there is depicted a system metadata map illustrating as association of system operations to schedules to impact.

Table E: System Metadata map: system operations schedules.

TABLE E

| Operation | Schedule | Impact |
|---|---|---|
| Garbage Collection | 10 AM | Delayed IO, Slow Write |
| Tiering Adjustment | 11 PM | Slow Write |
| File System Journaling | 1 AM | CPU Consumption, Delayed IO |
| Load-Balancing | 12:30 AM | Slow IO |
| — | — | — |

Figure 7:
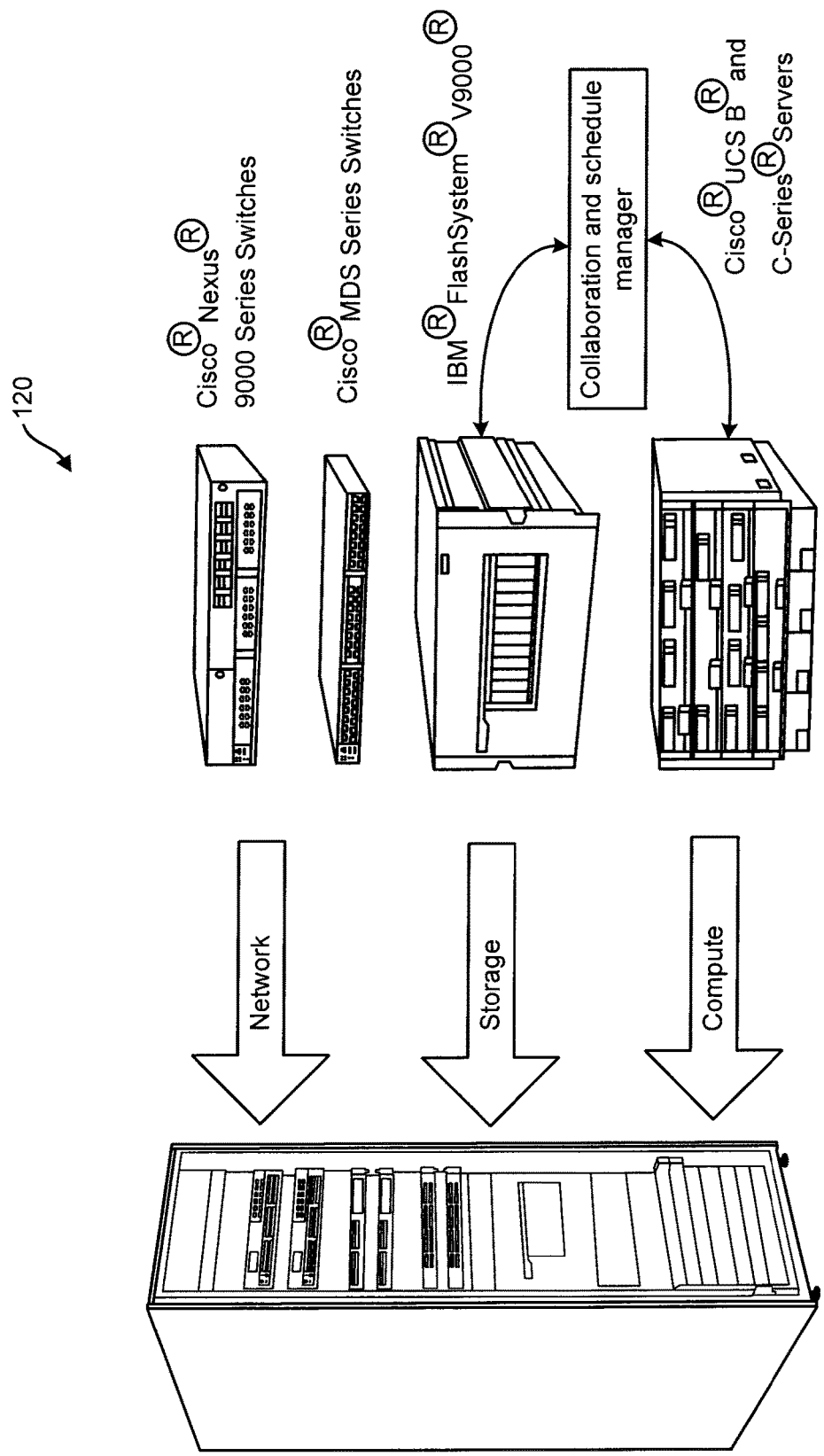
FIG. 7 depicts a hardware implementation of a unified storage system according to one embodiment.

In FIG. 7 there is depicted a hardware implementation of a unified storage system that includes a VersaStack® device box (left side of drawing), Cisco® Nexus® 9000 Series Switches, Cisco® MDS Series® switches, IBM® FlashSystem® V9000® flash storage, and Cisco® UCS B® and C-Series® servers. VersaStack® and IBM® and FlashSystem® and V9000® are registered trademarks of International Business Machines Corporation. Cisco® Nexus® 9000 and MDS Series® and UCS B® and C-Series® are registered trademarks of Cisco Systems, Inc.

Figure 8:
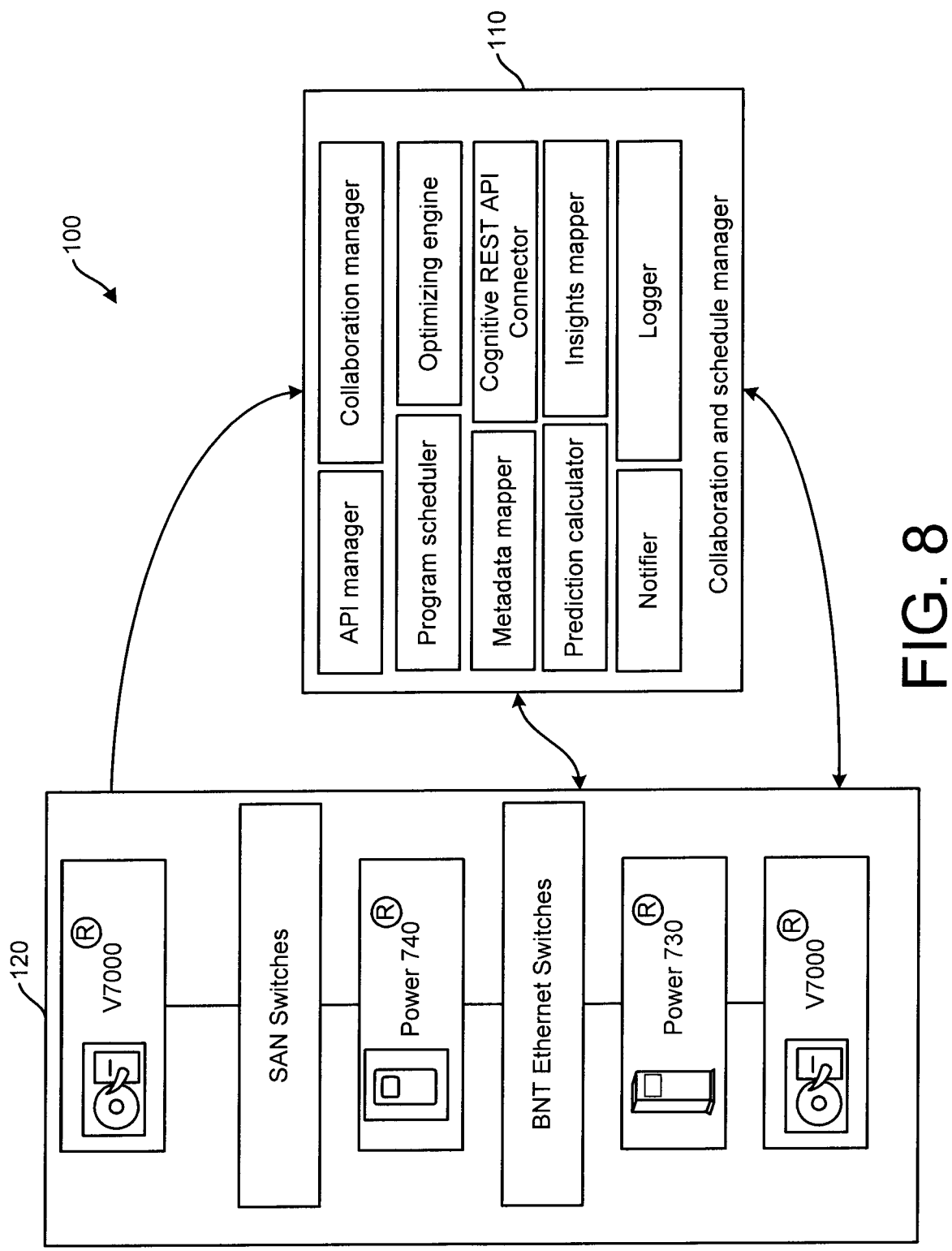
FIG. 8 depicts a system having a manager system and a unified storage system according to one embodiment.

In FIG. 8 there is depicted a schematic diagram of a system 100 having a unified storage system 120 that includes IBM® V7000® storage systems, IBM® Power 730® and Power 740® servers, and BNT Ethernet switches. IBM® and V7000® and Power 730® and Power 740® are registered trademarks of International Business Machines Corporation.

There is set forth herein integrating an analytics application to provide I/O execution schedule data to a storage system so that the storage system can collect SSD garbage and perform other grooming operations for mitigated conflicts with application layer demands. There is set forth herein features to demand I/O pattern/type/capacity etc. from analytics applications using APIs. There is set forth herein an ability to map the I/O patterns generated by analytics operations and perform the storage internal operations accordingly to mitigate conflict between operations at various different layers of a unified storage system 120. There is set forth herein features to provide the expectations to the storage system (for example application A demands low latency and B demands more storage space. In such cases, application A's data will be placed to faster tier storage and garbage collection is performed for B). There is set forth herein features to monitor the storage process schedules and provide ability to tune them based on an application's characteristics. There is set forth herein features to provide a heads-up notification to a storage system for upcoming analysis requests so that it can be prepared for an analytics request. Preparation can include e.g. garbage collection to make the clean space for new WRITE I/O operations.

There is set forth herein features to integrate a API based solution which can collect the storage specific operations like SSD garbage collection, tiering movements, load balancing activity maps and load them in an apparatus to control these function cycles. There is set forth herein features to parse the collected information from different systems like applications, file systems, virtualization device and backend disk controller and able to embed the collected information in metadata used to create the schedules. There is set forth herein features to provide journaling details of underlying file system and schedule journaling activities based on the application comfort. There is set forth herein features to execute mentioned backend grooming activities based on the applications nature. There is set forth herein features to coordinate across the devices in a unified storage system 120 and provides a suitable, efficient way to perform system operations. There is set forth herein features to connect with a cognitive engine via means of protocols and API architecture like REST and consume insights. There is set forth herein features to generate the plan for all the activities schedule and notify the users via means of embodied cognition. There is set forth herein features to modify the application and/or lower layer operation schedule sequence based on the requirements. There is set forth herein features to switch back to normal mode and in an on demand mode can articulate insights based on the specific request by the user. There is set forth herein features to provide a collaborative scheduler for unified storage system implemented big data architectures.

Some embodiments may include one, or more, of the following features, characteristics, operations and/or advantages: (i) method for organizing execution of grooming operations by a storage controller for a storage device of a storage system; (ii) collecting an I/O (input/output) execution schedule from the storage controller and applications in the appliance; (iii) fetching information of the grooming operations of the storage system via schedule discovery of the storage controller, server systems and applications, including pattern and/or type and/or capacity; (iv) maintaining in a registry all required grooming operations on every layer within a tree of all layers within the storage system, with a corresponding performance impact; (v) creating a timetable including execution times for periodic storage system operations; (vi) identifying at least one gap in the timetable; (vii) moving an execution time of one or more grooming operation from the registry into the gap, and tuning the schedule considering application preferences; and/or (viii) repeating the foregoing operations, as appropriate, to adapt to a changing usage pattern of the appliance.

Figure 9:
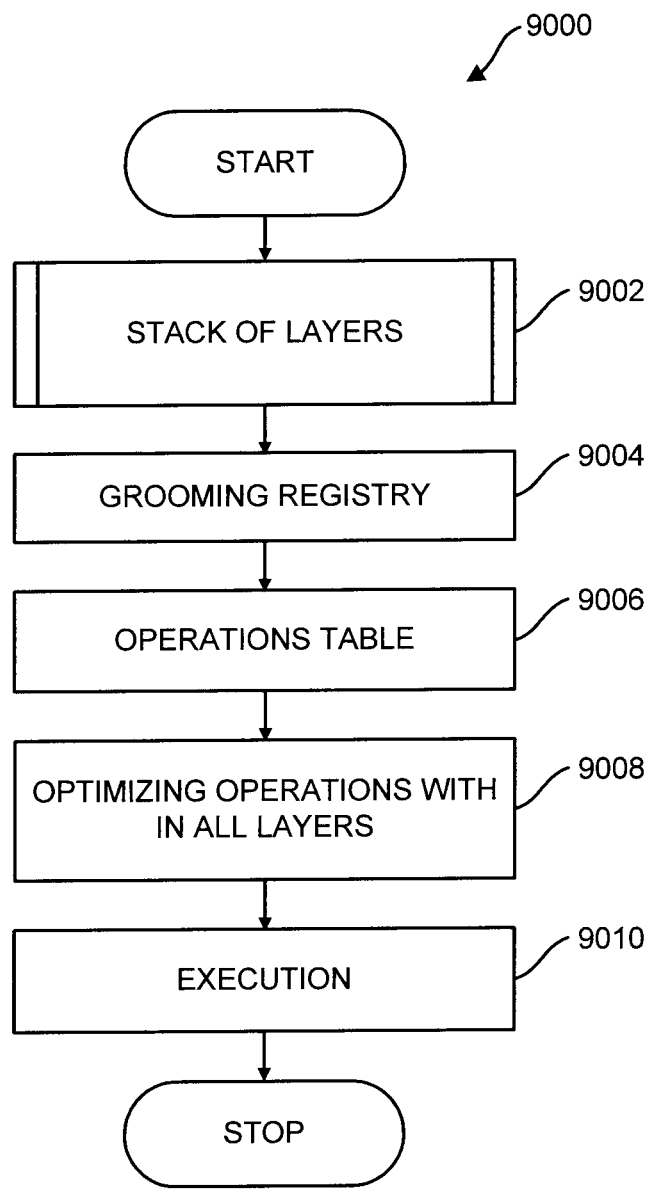
FIG. 9 is a flowchart illustrating a method for performance by a manager system according to one embodiment.

A method 9000 for performance by manager system 110 is set forth in FIG. 9.

At block 9002, manager system 110 can perform building a tree of all layers within a unified storage system (e.g. a database application/operating system/hypervisor/storage/network). This may be also being done during manufacturing phase.

At block 9004, manager system 110 can perform generating a grooming registry (knowledgebase may base used for easing this task) of scheduled grooming operations on every layer with performance impact recorded (e.g. the application layer grooming operation of generating stats on database tables can have a large performance impact, while RAID grooming operation of a controller battery relearning process can have limited performance impact).

A grooming operation can include for a database application, e.g. the grooming operation of generating stats for tables, database vacuuming grooming operations, rebuilding indexes grooming operations, sorting content of data files grooming operations.

A grooming operation can include for an operating system e.g. the grooming operation of performing package updates.

A grooming operation can include for a storage controller e.g. the grooming operation of performing garbage collection to reclaim erased blocks of data.

At block 9004, manager system 110 can perform creating a table with periodic performance demanding/degrading appliance operations, e.g. heavy data load operations, using statistics collected at multiple layers. Such table can be e.g. hourly oriented. Optionally such table may be supplemented by manual input of user.

At block 9006, manager system 110 can perform moving operations from the grooming registry generated at block 9002 into gaps found within table created at block 9004 using collected performance data for various layers to optimize operation within all layers. Some form of prioritized tasks may also be used by manager system 110.

At block 9008 manager system 110 can perform presenting a scheduler output to the administrator to be accepted and confirmed or alternatively the updated schedule can be automatically implemented and can be subject to overriding by administrator user manual input.

At block 9010 manager system 110 can execute in accordance with the updated schedule. Such algorithm can be executed regularly e.g. daily or weekly to adapt to the changing usage pattern of one or more appliance of a unified storage system 120.

Certain embodiments herein can offer various technical computing advantages involving computing advantages to address problems arising in the realm of computer networks. For enhancement of computational accuracies, embodiments can feature computational platforms existing only in the realm of computer networks such as artificial intelligence platforms including machine learning platforms. Embodiments herein can examine metrics data for improved computer system operation in the environment of a unified storage system. Embodiments herein can predict I/O activity level patterns for a unified storage system and can maintain a grooming registry that specifies grooming operations performed at various layers of an I/O stack defining the unified storage system. Embodiments herein can use a trained predictive model trained by machine learning for performing predictions. Embodiments herein can cognitively schedule grooming operations for mitigating conflicts between operations of different layers of an I/O stack of a unified storage system. Scheduling can be performed to mitigate, e.g. avoid or reduce conflicts between e.g. a storage controller grooming operation and an application layer grooming operation.

Figure 10:
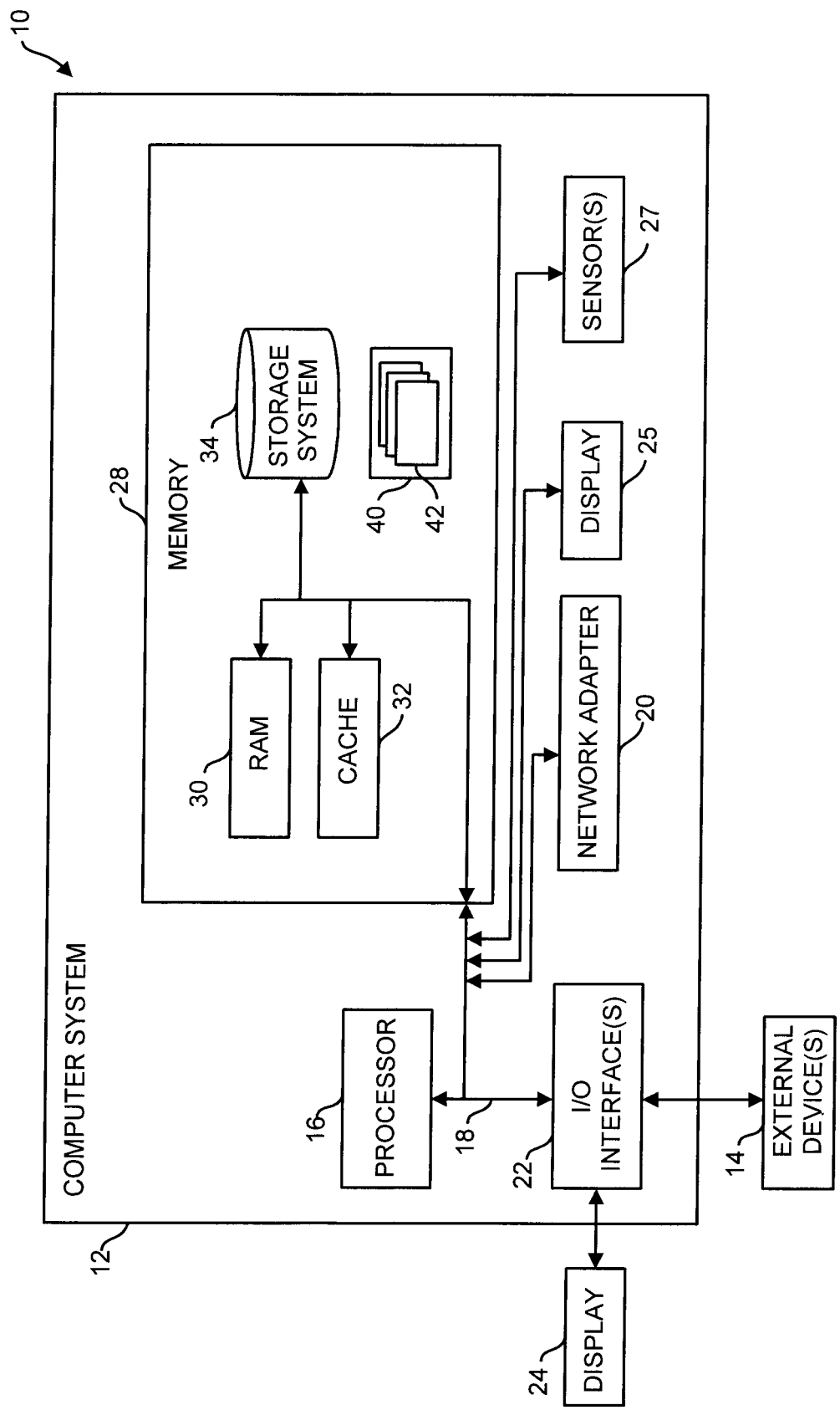
FIG. 10 depicts a computing node according to one embodiment.
Figure 11:
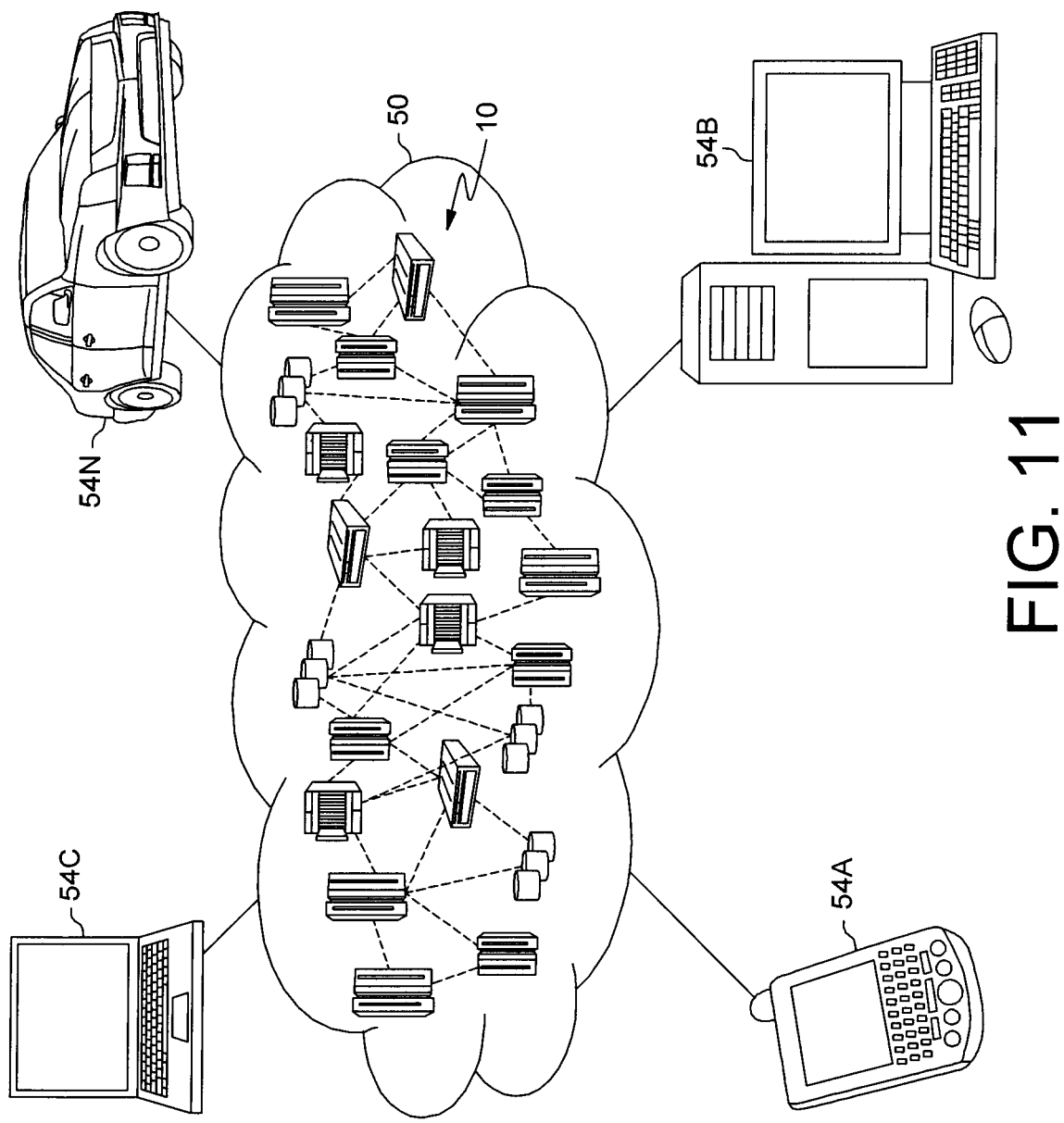
FIG. 11 depicts a cloud computing environment according to one embodiment.
Figure 12:
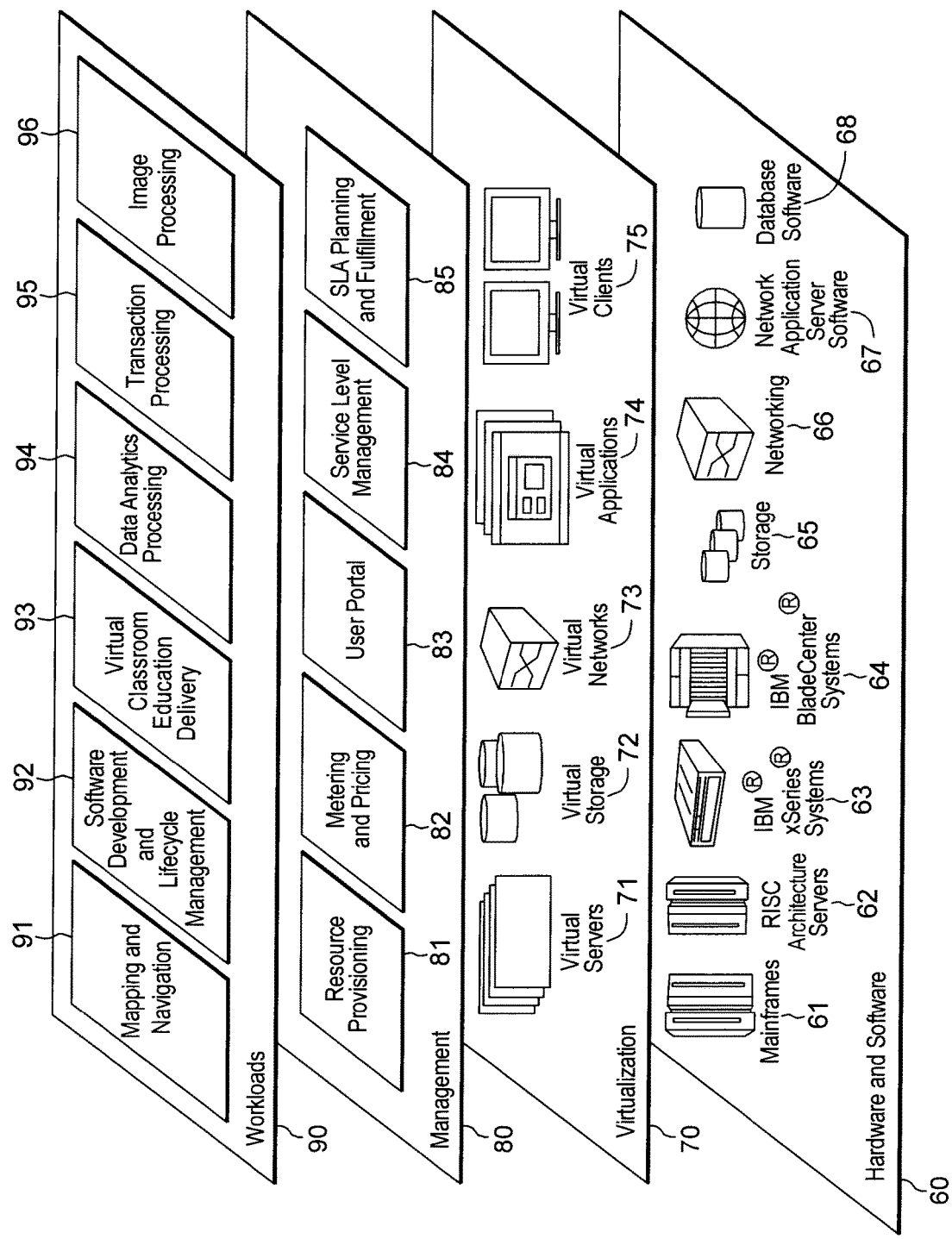
FIG. 12 depicts abstraction model layers according to one embodiment.

FIGS. 10-12 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 10, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to manager system 110 as set forth in the flowchart of FIG. 2. In one embodiment, manager system 110 can include one or more computing node 10 and can include one or more program 40 for performing functions described with reference to manager system 110 as set forth in the flowchart of FIG. 9. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for performing scheduling coordination as set forth herein. The processing components 96 can be implemented with use of one or more program 40 described in FIG. 10.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method for organizing execution of grooming operations by a storage controller for a storage device of a storage system, comprising the steps of:
   (a) collecting a grooming operation schedule from said storage controller and applications in said storage system;
   (b) maintaining in a grooming operation registry grooming operations data for grooming operations which include grooming operations by the storage controller and the applications performed by different layers within said storage system, the grooming operations data including for a plurality of grooming operations, schedule data and performance impact data;
   (c) providing a timetable comprising execution times for periodic operations of the storage system;
   (d) identifying at least one gap in said timetable using data of the performance impact data;
   (e) moving an execution time of one or more grooming operation of the plurality of grooming operations specified in said grooming operation registry into said gap; and
   (f) repeating steps (a) to (e) to adapt to a changing usage pattern of said storage system.

2. The method of claim 1, wherein the collecting a grooming operation schedule includes collecting a grooming operation schedule from an operating system (OS) of the storage system, and wherein the moving an execution time includes moving an execution time of an operating system grooming operation performed by the operating system.

3. The method of claim 1, wherein the performance impact data includes historical data specifying I/O activity levels attributable to the plurality of grooming operations during past iterations of the plurality of grooming operations.

4. The method of claim 1, wherein the identifying at least one gap includes identifying at least one period wherein an I/O activity level of the storage system is less than a threshold.

5. The method of claim 1, wherein the identifying at least one gap includes identifying a period where no other grooming operations of the storage system are being performed.

6. The method of claim 1, wherein the collecting a grooming operation schedule from said storage controller includes receiving data from an API of said storage controller.

7. The method of claim 1, wherein the performance impact data includes historical data provided by obtaining metrics data from multiple different I/O stack layers of the storage system, wherein the metrics data includes fragmentation metrics data from a disk controller layer, wherein the metrics data includes wear level metrics data from a flash controller layer, wherein the metrics data includes free space metrics data from a virtual storage layer, wherein the metrics data includes swap space metrics data from an OS layer, wherein the metrics data includes database write metrics from an application layer, and wherein the metrics data includes file system type metrics data from a guest OS.

8. The method of claim 1, wherein the identifying at least one gap includes examining a predicted I/O activity level pattern for a period being subject to scheduling to identify times at which the predicted activity level falls below a threshold.

9. The method of claim 1, wherein the identifying at least one gap includes examining a predicted I/O activity level pattern for a period being subject to scheduling to identify times at which the predicted I/O activity level falls below a threshold, wherein the method includes examining metrics data obtained from multiple different layers of the storage system for generating an I/O activity level pattern for a period prior to the period being subject to scheduling, and using the generated I/O activity level pattern for providing the predicted activity level pattern.

10. The method of claim 1, wherein the identifying at least one gap includes examining a predicted activity level pattern for a period being subject to scheduling, wherein providing the predicted activity level pattern includes querying a trained predictive model that has been trained by machine learning using training data, the trained predictive model on being queried with a grooming operation identifier returning a predicted activity level and end time for the grooming operation associated to the grooming operation identifier.

11. The method of claim 1, wherein the performance impact data is defined by historical data derived in dependence on historical instances of grooming operations.

12. A method for organizing execution of grooming operations in a storage system having an I/O stack including a plurality of layers, the method comprising:
  (a) obtaining metrics data from at least first and second layers of the plurality of layers;
  (b) identifying, using data of the metrics data, at least one gap in the execution of scheduled operations performed by the storage system;
  (c) moving an execution time of one or more grooming operation of the plurality of grooming operations specified into said at least one gap; and
  (d) repeating steps (a) to (c) to adapt to a changing usage pattern of said storage system.

13. The method of claim 12, wherein the metrics data includes one or more of the following selected from the group consisting of: fragmentation metrics data from a disk controller layer, wear level metrics data from a flash controller layer, free space metrics data from a virtual storage layer, swap space metrics data from an OS layer, database write metrics from an application layer, and file system type metrics data from a guest OS.

14. The method of claim 12, wherein the identifying at least one gap includes examining a predicted I/O activity level pattern for a period being subject to scheduling to identify times at which the predicted I/O activity level falls below a threshold, wherein the method includes examining metrics data obtained from multiple different layers of the storage system for generating an I/O activity level pattern for a period prior to the period being subject to scheduling, and using the generated I/O activity level pattern for providing the predicted activity level pattern.

15. The method of claim 12, wherein the identifying at least one gap includes examining a predicted I/O activity level pattern for a period being subject to scheduling to identify times at which the predicted I/O activity level falls below a threshold, wherein the method includes examining metrics data obtained from multiple different layers of the storage system for generating an I/O activity level pattern for a period prior to the period being subject to scheduling, and using the generated I/O activity level pattern for providing the predicted activity level pattern, wherein the using includes applying the generated I/O activity level pattern as query data into a trained predictive model that has been trained by machine learning to return predicted I/O activity level pattern data in response to being queried by a generated I/O activity level pattern.

16. The method of claim 12, wherein the method includes collecting a grooming operation schedule, wherein the collecting a grooming operation schedule includes collecting a grooming operation schedule from an operating system (OS) of the storage system, and wherein the moving an execution time includes moving an execution time of an operating system grooming operation performed by the operating system.

17. A method for organizing execution of grooming operations in a storage system having an I/O stack including a plurality of layers, the method comprising:
  (a) obtaining grooming operation scheduling data specifying a schedule of grooming operations performed by at least first and second layers of the plurality of layers;
  (b) identifying, using data of grooming operation scheduling data, at least one gap in the execution of scheduled operations performed by the storage system;
  (c) moving an execution time of one or more grooming operation of the grooming operations into said at least one gap; and
  (d) repeating steps (a) to (c) to adapt to a changing usage pattern of said storage system.

18. The method of claim 17, wherein the one or more grooming operation includes each of a garbage collection operation, a tiering operation, and a load balancing operation.

19. The method of claim 17, identifying includes predicting an I/O activity level pattern for the storage system for a period being subject to scheduling, wherein the predicting includes providing an I/O activity level pattern of the storage system for a certain period, and using the activity level pattern for performing the predicting.

20. The method of claim 17, wherein the identifying at least one gap includes using metrics data obtained from multiple different layers of the a plurality layers of the storage system, wherein the metrics data includes fragmentation metrics data from a disk controller layer, wherein the metrics data includes wear level metrics data from a flash controller layer, wherein the metrics data includes free space metrics data from a virtual storage layer, wherein the metrics data includes swap space metrics data from an OS layer, wherein the metrics data includes database write metrics from an application layer, and wherein the metrics data includes file system type metrics data from a guest OS.

21. The method of claim 17, wherein the identifying at least one gap includes examining a predicted I/O activity level pattern for a period being subject to scheduling to identify times at which the predicted activity level falls below a threshold.

\* \* \* \* \*